US009876574B2

(12) United States Patent
Zhang

(10) Patent No.: US 9,876,574 B2
(45) Date of Patent: Jan. 23, 2018

(54) OPTICAL REPEATER AND OPTICAL FIBER COMMUNICATIONS SYSTEM

(71) Applicant: Huawei Marine Networks Co., Ltd., Tianjin (CN)

(72) Inventor: Wendou Zhang, Wuhan (CN)

(73) Assignee: Huawei Marine Networks Co., Ltd., Tianjin (CN)

( * ) Notice: Subject to any disclaimer, the term of this patent is extended or adjusted under 35 U.S.C. 154(b) by 0 days.

(21) Appl. No.: 15/350,995

(22) Filed: Nov. 14, 2016

(65) Prior Publication Data

US 2017/0063463 A1    Mar. 2, 2017

Related U.S. Application Data

(63) Continuation of application No. PCT/CN2014/077443, filed on May 14, 2014.

(51) Int. Cl.
*H04B 10/00* (2013.01)
*H04B 10/291* (2013.01)
(Continued)

(52) U.S. Cl.
CPC ....... *H04B 10/2914* (2013.01); *G02B 6/4427* (2013.01); *H01S 3/06783* (2013.01);
(Continued)

(58) Field of Classification Search
CPC .......................................... H04B 10/29–10/299
(Continued)

(56) References Cited

U.S. PATENT DOCUMENTS 5,005,937 A * 4/1991 Aida ..................... H04B 10/27
385/24
5,500,756 A * 3/1996 Tsushima ........... H04B 10/0777
398/177
(Continued)

FOREIGN PATENT DOCUMENTS

CN     101997612 A     3/2011
CN     103701522 A     4/2014
(Continued)

OTHER PUBLICATIONS

Lee et al., "A Detailed Experimental Study on Single-Pump Raman/EDFA Hybrid Amplifiers: Static, Dynamic, and System Performance Comparison," IEEE Journal of Lightwave Technology, vol. 23, No. 11, pp. 3484-3493, Institute of Electrical and Electronic Engineer, New York, New York (Nov. 2005).
(Continued)

*Primary Examiner* — Agustin Bello
(74) *Attorney, Agent, or Firm* — Leydig, Voit & Mayer, Ltd.

(57) ABSTRACT

Embodiments of the present disclosure provide an optical repeater and an optical fiber communications system. An implementation solution of the optical repeater includes: a first input end of the optical repeater, a first output end of the optical repeater, a first erbium doped fiber, a first coupler, a second coupler, and a first pump light processing component, where the first input end of the optical repeater is connected to an input end of the first erbium doped fiber, an output end of the first erbium doped fiber is connected to an input end of the first coupler, a first output end of the first coupler is connected to a first input end of the second coupler, and an output end of the second coupler is connected to the first output end of the optical repeater.

17 Claims, 12 Drawing Sheets

(51) Int. Cl.
  *H04B 10/29* (2013.01)
  *G02B 6/44* (2006.01)
  *H01S 3/067* (2006.01)
  *H01S 3/094* (2006.01)
  *H01S 3/16* (2006.01)

(52) U.S. Cl.
  CPC ...... *H01S 3/094015* (2013.01); *H01S 3/1608* (2013.01); *H04B 10/29* (2013.01); *H04B 10/2916* (2013.01)

(58) Field of Classification Search
  USPC .................................................. 398/173–181
  See application file for complete search history.

(56) References Cited

U.S. PATENT DOCUMENTS

| | | | | |
|---|---|---|---|---|
| 5,680,246 A * | 10/1997 | Takahashi | H01S 3/1301 | 359/341.43 |
| 5,784,192 A * | 7/1998 | Sugiyama | H01S 3/1301 | 359/341.2 |
| 5,805,322 A * | 9/1998 | Tomofuji | H04B 10/0775 | 398/177 |
| 5,861,972 A * | 1/1999 | Tomooka | H04B 10/0773 | 398/177 |
| 5,875,054 A * | 2/1999 | Onoda | H04B 10/2972 | 359/337 |
| 5,883,735 A * | 3/1999 | Sugiyama | H01S 3/1301 | 359/341.42 |
| 6,067,187 A * | 5/2000 | Onaka | H01S 3/06754 | 359/337 |
| 6,188,510 B1 * | 2/2001 | Edagawa | H04B 10/2918 | 359/341.33 |
| 6,348,987 B1 * | 2/2002 | Tomofuji | H04B 10/0775 | 359/341.41 |
| 6,377,395 B2 * | 4/2002 | Sugaya | H01S 3/06758 | 359/337.12 |
| 6,424,445 B1 * | 7/2002 | Tsushima | H01S 3/1301 | 398/177 |
| 6,466,348 B1 * | 10/2002 | Izumi | H04B 10/0775 | 359/341.41 |
| 6,469,824 B2 * | 10/2002 | Sasaki | H01S 3/06754 | 359/341.43 |
| 6,600,584 B2 * | 7/2003 | Tomofuji | H04B 10/0775 | 359/341.3 |
| 7,162,119 B2 * | 1/2007 | Martinelli | H04B 10/2916 | 372/3 |
| 7,174,108 B2 * | 2/2007 | Kamura | H04B 10/0777 | 359/337 |
| 7,308,208 B2 * | 12/2007 | Watanabe | H04B 10/0777 | 359/341.4 |
| 7,394,995 B2 * | 7/2008 | Audic | H04B 10/67 | 250/214 A |
| 7,692,852 B2 * | 4/2010 | Akasaka | H01S 3/06754 | 359/337.4 |
| 8,036,538 B2 * | 10/2011 | Wang | H04B 10/0771 | 359/337 |
| 8,213,805 B2 * | 7/2012 | Sakamoto | H04B 10/0775 | 398/15 |
| 8,339,698 B2 * | 12/2012 | Hiraizumi | H01S 3/06754 | 359/334 |
| 2001/0050806 A1 * | 12/2001 | Sasaki | H01S 3/06754 | 359/341.43 |
| 2002/0012497 A1 * | 1/2002 | Kosaka | H04B 10/2935 | 385/24 |
| 2002/0030876 A1 * | 3/2002 | Tomofuji | H04B 10/0775 | 398/177 |
| 2002/0044324 A1 * | 4/2002 | Hoshida | H04B 10/2916 | 398/178 |
| 2002/0126952 A1 * | 9/2002 | Shirai | H04B 10/07 | 385/24 |
| 2003/0020995 A1 * | 1/2003 | Harasawa | H04B 10/0777 | 398/178 |
| 2003/0035184 A1 * | 2/2003 | Deguchi | H04B 10/0771 | 398/177 |
| 2003/0072063 A1 * | 4/2003 | Adams, Sr. | G02B 6/4442 | 398/173 |
| 2003/0223106 A1 * | 12/2003 | Lee | H04B 10/2942 | 359/341.33 |
| 2004/0151510 A1 * | 8/2004 | Tanaka | H04B 10/25253 | 398/147 |
| 2004/0184817 A1 * | 9/2004 | Iwasaki | H04B 10/2916 | 398/177 |
| 2004/0201882 A1 * | 10/2004 | Kikuchi | H04B 10/2916 | 359/341.43 |
| 2004/0246566 A1 * | 12/2004 | Miyamoto | H01S 3/302 | 359/334 |
| 2004/0252999 A1 * | 12/2004 | Onaka | H01S 3/06758 | 398/177 |
| 2005/0100343 A1 * | 5/2005 | Yoshida | H04B 10/2916 | 398/177 |
| 2006/0146398 A1 * | 7/2006 | Aozasa | H01S 3/06754 | 359/341.1 |
| 2006/0164716 A1 * | 7/2006 | Leplingard | H01S 3/06754 | 359/334 |
| 2006/0187539 A1 * | 8/2006 | Zhou | H01S 3/10007 | 359/341.4 |
| 2008/0123180 A1 * | 5/2008 | Nakata | H04B 10/2916 | 359/334 |
| 2009/0207482 A1 * | 8/2009 | Izumi | H04B 10/075 | 359/334 |
| 2010/0157416 A1 * | 6/2010 | Sugaya | G02B 6/264 | 359/334 |
| 2010/0183305 A1 * | 7/2010 | Chang | H01S 3/06758 | 398/67 |
| 2011/0141552 A1 * | 6/2011 | Ghera | H04B 10/2916 | 359/334 |
| 2014/0063592 A1 * | 3/2014 | Ip | H04B 10/293 | 359/337.1 |
| 2017/0063463 A1 * | 3/2017 | Zhang | H04B 10/29 | |

FOREIGN PATENT DOCUMENTS

| | | |
|---|---|---|
| CN | 103746283 A | 4/2014 |
| EP | 0954125 A2 | 11/1999 |
| EP | 1018666 A1 | 7/2000 |
| WO | WO 03069812 A1 | 8/2003 |

OTHER PUBLICATIONS

Lee et al., "Experimental Performance Comparison for a Variety of Single Pump, Highly Efficient, Dispersion Compensating Raman/EDFA Hybrid Amplifiers," OThF6, Optical Society of America (2005).

* cited by examiner

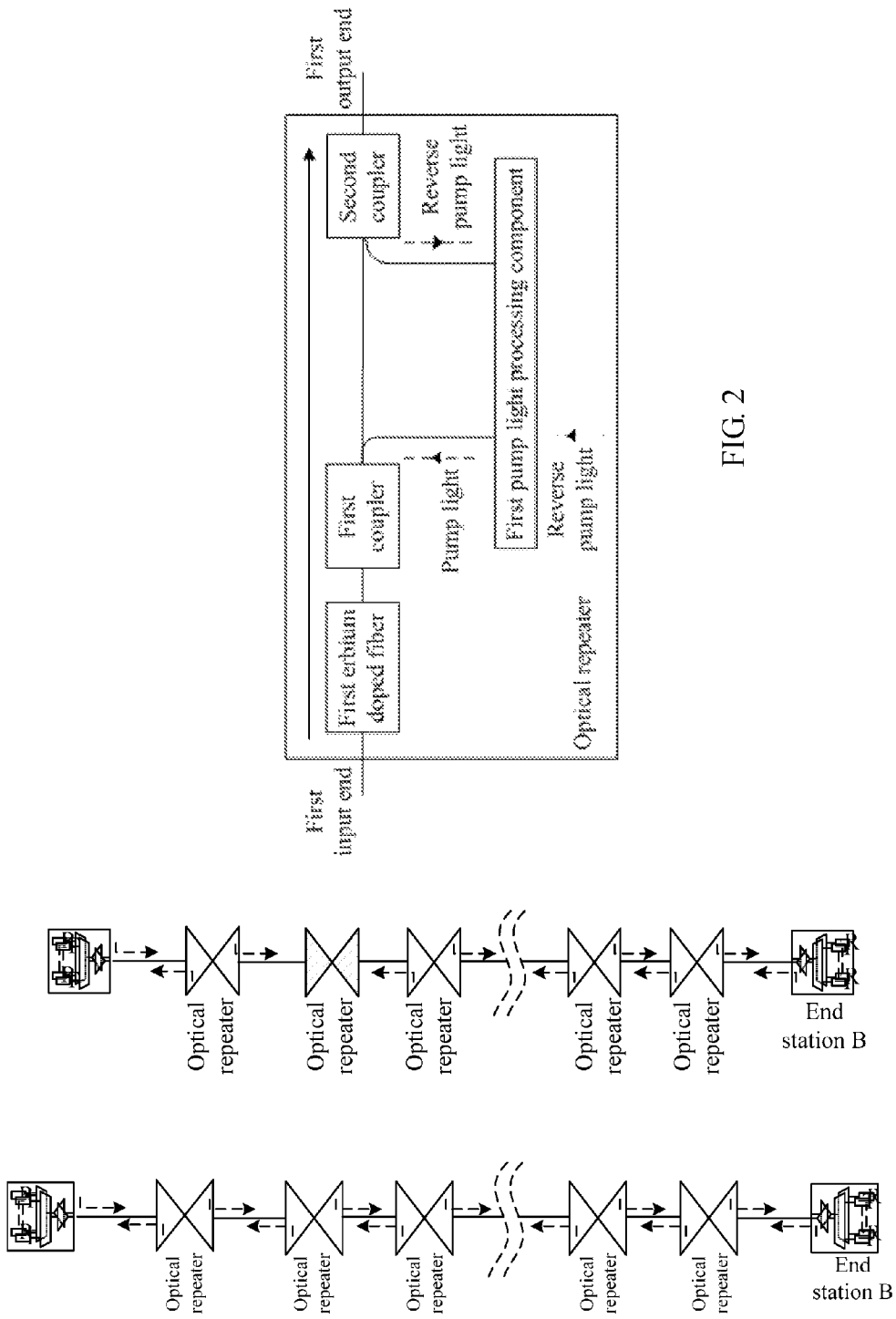

OPTICAL REPEATER AND OPTICAL FIBER COMMUNICATIONS SYSTEM

CROSS-REFERENCE TO RELATED APPLICATIONS

This application is a continuation of International Application No. PCT/CN2014/077443, filed on May 14, 2014, the disclosure of which is hereby incorporated by reference in its entirety.

TECHNICAL FIELD

The present disclosure relates to the field of communications technologies, and in particular, to an optical repeater and an optical fiber communications system.

BACKGROUND

An erbium doped fiber amplifier (EDFA) was used in a submarine cable optical repeater for the first time in a submarine cable project in 1996, which ushered in a new era of the submarine cable optical relay technology. Compared with a traditional regeneration-type optical repeater, design is significantly simplified and system reliability is improved. However, the introduction of the erbium doped fiber amplifier also brings a new problem, that is, the decrease of an optical signal-to-noise ratio (OSNR) caused by accumulation of spontaneous emission noise. A submarine cable system with repeaters usually uses relay distances of an equal span, and a gain of the optical repeater exactly compensates an optical fiber loss of a span. An optical signal-to-noise ratio of receiving-end signals can be obtained through calculation by using the following formula:

$$OSNR(\text{dB}) = 58 - 10\log\left(\sum_{i=1}^{N} \frac{NF_i}{P_i^{in}}\right)$$

where $NF_i$ denotes a noise factor (a linear value) of the $i^{th}$ optical repeater, $P_i^{in}$ denotes single-wavelength input power (a linear value) of the $i^{th}$ optical repeater, and N is a quantity of the optical repeaters. It can be seen from the foregoing formula that an OSNR of a signal light is determined by a noise factor of an optical repeater at each level and input power of a signal light in an optical repeater at each level.

According to the foregoing formula, it can be learned that: when all optical repeaters are normal, noise factors and single-wavelength input power of all optical repeaters are the same, and contributions of all optical repeaters to accumulation of a system OSNR are also the same; if one optical repeater in the system fails and as a result, its output power is decreased, input power of a downstream neighboring optical repeater is decreased and more spontaneous emission noise is introduced and accumulated; and if pump power of one optical repeater in the system is completely lost, an erbium doped fiber (EDF) in the optical repeater also produces a significant absorption loss to signals, which significantly decreases input power of a downstream neighboring optical repeater and as a result, the system OSNR is degraded abruptly. Generally, two pumps are used for redundancy backup in a repeater, to maintain high enough signal input power of the optical repeater, restrain excessive accumulation of spontaneous emission noise, and avoid severe degradation of an optical signal-to-noise ratio. Enough high output power can be maintained even when one pump fails, so that input power of a downstream optical repeater is not significantly decreased and an optical signal-to-noise ratio is not significantly degraded. In the industry, four pumps are also used for redundancy backup in a repeater. In this case, a system service is not interrupted even when three pumps fail. However, when all pumps in a fiber pair fail or a power supply unit of the optical repeater fails, the foregoing solutions may cause rapid degradation of the system OSNR and even service interruption.

In another aspect, as signals carried by a submarine cable develop towards a signal transmission rate of above 100 Gb/s, a higher-order modulation format, such as 8 quadrature amplitude modulation (8QAM) and 16 quadrature amplitude modulation (16QAM), requires a higher optical signal-to-noise ratio, which limits a system transmission distance. A distributed Raman amplification technology can provide a lower noise factor to improve the system OSNR; however, productization of an underwater optical repeater is difficult due to restriction by elements, such as, high power consumption, and that an operating point close to a linear area is disadvantageous to fault tolerance. As a compromise solution, hybrid amplification implemented by a reverse distributed Raman amplifier and an erbium doped fiber amplifier (EDFA) helps to reduce a noise factor without increasing much power consumption, and is a technical development trend of an underwater optical repeater. However, an optical repeater with hybrid amplification of a reverse distributed Raman amplifier and an EDFA also has a problem of technical deficiencies as those in the optical repeater based on the EDFA technology. When an EDFA pump fails, an EDF may produce an absorption loss to a signal, causing degradation of an optical signal-to-noise ratio of a service signal.

Generally, for underwater breakdown maintenance of a submarine cable communications system, a dedicated submarine cable maintenance ship needs to be dispatched, a maintenance period is about 2 weeks on average, and most of the time is spent on spare part transportation and sailing. An economic loss caused by service interruption during a system breakdown period is huge; therefore, a submarine cable optical repeater needs to be highly reliable. However, when an EDFA pump in the optical repeater fails, the EDF may produce an absorption loss to a signal, which causes abrupt degradation of an OSNR of a service signal and even service interruption, and therefore, reliability of the optical repeater is low.

SUMMARY

Embodiments of the present disclosure provide an optical repeater and an optical fiber communications system, which are used to improve reliability of an optical fiber communications system.

A first aspect of an embodiment of the present disclosure provides an optical repeater, including:

a first input end of the optical repeater, a first output end of the optical repeater, a first erbium doped fiber, a first coupler, a second coupler, and a first pump light processing component, where:

the first input end of the optical repeater is connected to an input end of the first erbium doped fiber, an output end of the first erbium doped fiber is connected to an input end of the first coupler, a first output end of the first coupler is connected to a first input end of the second coupler, and an output end of the second coupler is connected to the first output end of the optical repeater; an input end of the first pump light processing component is connected to a second input end of the second coupler; and an output end of the first pump light processing component is connected to a second output end of the first coupler;

reverse pump lights enter the optical repeater through the first output end and enter the second coupler through the output end of the second coupler, and the second coupler couples the reverse pump lights that enter the second coupler and sends a coupled reverse pump light to the input end of the first pump light processing component through the second input end of the second coupler;

a signal light enters the optical repeater through the first input end of the optical repeater, passes through the first erbium doped fiber, the first coupler, and the second coupler in turn, and is finally sent out of the optical repeater through the first output end of the optical repeater; and the output end of the first pump light processing component sends a pump light to the second output end of the first coupler, where the pump light includes a local-end pump light generated by the first pump light processing component and/or the reverse pump lights; and the first coupler sends the pump light received by the second output end of the first coupler to the output end of the first erbium doped fiber through the input end of the first coupler, and enters the first erbium doped fiber through the output end of the first erbium doped fiber.

With reference to the implementation manner of the first aspect, in a first possible implementation manner, the optical repeater further includes a third coupler, where the output end of the first pump light processing component includes a first output end of the first pump light processing component and a second output end of the first pump light processing component;

an input end of the third coupler is connected to the first input end of the optical repeater, and a first output end of the third coupler is connected to the input end of the first erbium doped fiber; a second output end of the third coupler is connected to the second output end of the first pump light processing component; and the second output end of the first coupler is connected to the first output end of the first pump light processing component;

the second output end of the first pump light processing component sends a pump light to the second output end of the third coupler; and the third coupler sends the pump light received by the second output end of the third coupler to the first input end of the optical repeater through the input end of the third coupler; and the first output end of the first pump light processing component sends a pump light to the second output end of the first coupler; and the first coupler sends the pump light received by the second output end of the first coupler to the output end of the first erbium doped fiber through the input end of the first coupler.

With reference to the first possible implementation manner of the first aspect, in a second possible implementation manner, the optical repeater further includes a sixth coupler, where the output end of the first pump light processing component further includes a third output end of the first pump light processing component;

the sixth coupler is located in an optical path of a signal light between the third coupler and the first erbium doped fiber; the first output end of the third coupler is connected to a first input end of the sixth coupler, the third output end of the first pump light processing component is connected to a second input end of the sixth coupler, and an output end of the sixth coupler is connected to the input end of the first erbium doped fiber; and the third output end of the first pump light processing component sends a pump light to the second input end of the sixth coupler; and the sixth coupler sends the pump light received by the second input end of the sixth coupler to the input end of the first erbium doped fiber through the output end of the sixth coupler.

With reference to the implementation manner of the first aspect, in a third possible implementation manner, the optical repeater includes a fourth coupler, an optical isolator, and a fifth coupler, where:

the fourth coupler, the optical isolator, and the fifth coupler are connected in turn in an optical path of a signal light between the optical repeater and the first erbium doped fiber; and an input end of the fifth coupler is connected to the first input end of the optical repeater, a first output end of the fifth coupler is connected to an input end of the optical isolator, an output end of the optical isolator is connected to a first input end of the fourth coupler, and a second output end of the fifth coupler is connected to a second input end of the fourth coupler; and after the pump light that enters the first erbium doped fiber amplifies the signal light that passes through the first erbium doped fiber, a residual pump light that is of a pump and enters the first erbium doped fiber is sent to an output end of the fourth coupler through the output end of the first erbium doped fiber, the fourth coupler sends the residual pump light received by the output end of the fourth coupler to the second output end of the fifth coupler through the second input end of the fourth coupler, and the fifth coupler sends the residual pump light received by the output end of the fifth coupler to the first input end of the optical repeater through the input end of the fifth coupler.

With reference to the implementation manner of the first aspect and the first, second, or third possible implementation manner of the first aspect, in a fourth possible implementation manner, the input end of the first pump light processing component includes a first input end of the first pump light processing component and a second input end of the first pump light processing component, where:

the first input end of the first pump light processing component is a port that is of the first pump light processing component and that is connected to the second input end of the second coupler; and the second input end of the first pump light processing component receives a reverse pump light that comes from an optical path of a signal light on a side opposite to the signal light.

With reference to the implementation manner of the first aspect and the first, second, or third possible implementation manner of the first aspect, in a fifth possible implementation manner, if the input end of the first pump light processing component includes a first input end of the first pump light processing component and a second input end of the first pump light processing component, the first input end of the first pump light processing component is a port that is of the first pump light processing component and that is connected to the second input end of the second coupler, and the second input end of the first pump light processing component receives a reverse pump light that comes from an optical path of a signal light on a side opposite to the signal light;

the first pump light processing component includes a first pump source, a first polarization beam combiner, a tenth coupler, and an eleventh coupler;

an output end of the first pump source is connected to an input end of the first polarization beam combiner, an output end of the first polarization beam combiner is connected to a first input end of the tenth coupler, and a first output end of the tenth coupler is used as the output end of the first pump light processing component;

a first input end of the eleventh coupler is used as the first input end of the first pump light processing component, a second input end of the eleventh coupler is used as the second input end of the first pump light processing component, and a first output end of the eleventh coupler is connected to a second input end of the tenth coupler; and the first pump source generates a local-end pump light and sends the local-end pump light to the input end of the first polarization beam combiner, and the first polarization beam combiner sends the local-end pump light that enters the input end of the first polarization beam combiner to the first input end of the tenth coupler through the output end of the first polarization beam combiner; the eleventh coupler couples a reverse pump light that enters from the first input end of the eleventh coupler and a reverse pump light that enters from the second input end of the eleventh coupler, and sends, from the first output end of the eleventh coupler to the second input end of the tenth coupler, a part of a reverse pump light obtained through coupling; and the tenth coupler couples the local-end pump light that enters from the first input end of the tenth coupler and the reverse pump light that enters from the second input end of the tenth coupler, and outputs, from the first output end of the tenth coupler, a part of pump light obtained through coupling.

With reference to the second possible implementation manner of the first aspect, in a sixth possible implementation manner, the first pump light processing component includes:

a second pump source, a third pump source, a twelfth coupler, and a thirteenth coupler, where:

an output end of the second pump source is connected to an input end of the twelfth coupler, and a first output end of the twelfth coupler is used as the second output end of the first pump light processing component; and an output end of the third pump source is connected to an input end of the thirteenth coupler, and a first output end of the thirteenth coupler is used as the third output end of the first pump light processing component;

the second pump source generates first local-end pump lights and sends the first local-end pump lights to the input end of the twelfth coupler through the output end of the second pump source, and the twelfth coupler couples the first local-end pump lights that enter the input end of the twelfth coupler, and outputs, from the first output end of the twelfth coupler, a part of a first local-end pump light obtained through coupling;

the third pump source generates second local-end pump lights and sends the second local-end pump lights to the input end of the thirteenth coupler through the output end of the third pump source, and the thirteenth coupler couples the second local-end pump lights that enter the input end of the thirteenth coupler, and outputs, from the first output end of the thirteenth coupler, a part of a second local-end pump light obtained through coupling;

the reverse pump light from the second output end of the second coupler enters from the input end of the first pump light processing component and is directly output to the second output end of the first coupler from the first output end of the first pump light processing component; and if the input end of the first pump light processing component includes a first input end of the first pump light processing component and a second input end of the first pump light processing component, the first input end of the first pump light processing component is a port that is of the first pump light processing component and that is connected to the second input end of the second coupler, the second input end of the first pump light processing component receives a reverse pump light that comes from an optical path of a signal light on a side opposite to the signal light, and the reverse pump light that comes from the optical path of a signal light on a side opposite to the signal light is directly output to the second output end of the first coupler from the first output end of the first pump light processing component.

With reference to the sixth possible implementation manner of the first aspect, in a seventh possible implementation manner, if the input end of the first pump light processing component includes the first input end of the first pump light processing component and the second input end of the first pump light processing component, the first pump light processing component further includes a fourteenth coupler;

a first input end of the fourteenth coupler is used as the first input end of the first pump light processing component, a second input end of the fourteenth coupler is used as the second input end of the first pump light processing component, and a first output end of the fourteenth coupler is used as the first output end of the first pump light processing component; and the fourteenth coupler couples the reverse pump light that comes from the second coupler and enters the first input end of the fourteenth coupler and the reverse pump light that comes from the optical path of a signal light on a side opposite to the signal light and enters the second input end of the fourteenth coupler, and sends a part of a reverse pump light obtained through coupling to the second output end of the first coupler through the first output end of the fourteenth coupler.

With reference to the implementation manner of the first aspect and the first, second, or third possible implementation manner of the first aspect, in an eighth possible implementation manner, the second coupler is a first circulator, where the first circulator is a circulator in which a first port, a second port, and a third port are connected in sequence, where:

the first port of the first circulator is the first input end of the second coupler, the second port of the first circulator is the output end of the second coupler, and the third port of the first circulator is the second input end of the second coupler.

With reference to the first, second, or third possible implementation manner of the first aspect, in a ninth possible implementation manner, the third coupler is a second circulator, where the second circulator is a circulator in which a first port, a second port, and a third port are connected in sequence, where:

the first port of the second circulator is the second output end of the third coupler, the second port of the second circulator is the input end of the third coupler, and the third port of the second circulator is the first output end of the third coupler.

With reference to the implementation manner of the first aspect and the first, second, or third possible implementation manner of the first aspect, in a tenth possible implementation manner, a gain flatness filter is further concatenated in an optical path of the signal light.

A second aspect of an embodiment of the present disclosure provides an optical repeater, including:

a first input end of the optical repeater, a first output end of the optical repeater, a second erbium doped fiber, a seventh coupler, an eighth coupler, a ninth coupler, and a second pump light processing component, where:

the first input end of the optical repeater is connected to an input end of the ninth coupler, a first output end of the ninth coupler is connected to a first input end of the seventh coupler, an output end of the seventh coupler is connected to the second erbium doped fiber, an output end of the second erbium doped fiber is connected to a first input end of the eighth coupler, and an output end of the eighth coupler is connected to the output end of the optical repeater; an input end of the second pump light processing component is connected to a second input end of the eighth coupler; and a first output end of the second pump light processing component is connected to a second output end of the ninth coupler, and a second output end of the second pump light processing component is connected to a second input end of the seventh coupler;

reverse pump lights enter the optical repeater through the first output end and enter the eighth coupler through the output end of the eighth coupler, and the eighth coupler couples the reverse pump lights that enter the eighth coupler and sends a coupled reverse pump light to the input end of the second pump light processing component through the second input end of the eighth coupler;

a signal light enters the optical repeater through the first input end of the optical repeater, passes through the ninth coupler, the seventh coupler, the second erbium doped fiber, and the eighth coupler in turn, and is finally sent out of the optical repeater through the first output end of the optical repeater; and the first output end of the second pump light processing component sends a pump light to the second output end of the ninth coupler; the second output end of the second pump light processing component sends a pump light to the second input end of the seventh coupler, where the pump light includes a local-end pump light generated by the first pump light processing component and/or the reverse pump lights; the pump light that enters the second output end of the ninth coupler is sent out of the optical repeater from the first input end of the optical repeater through the input end of the ninth coupler; and the pump light that enters the second input end of the seventh coupler is coupled by the seventh coupler and is sent to an input end of the second erbium doped fiber through the output end of the seventh coupler.

With reference to the implementation manner of the second aspect, in a first possible implementation manner, the input end of the second pump light processing component includes a first input end of the second pump light processing component and a second input end of the second pump light processing component; and the first input end of the second pump light processing component is a port that is of the second pump light processing component and that is connected to the second input end of the eighth coupler; and the second input end of the second pump light processing component receives a reverse pump light that comes from an optical path of a signal light on a side opposite to the signal light.

With reference to the first possible implementation manner of the second aspect, in a second possible implementation manner, the second pump light processing component includes:

a fourth pump source, a second polarization beam combiner, a fifteenth coupler, a sixteenth coupler, and a seventeenth coupler, where:

an output end of the fourth pump source is connected to an input end of the second polarization beam combiner, an output end of the second polarization beam combiner is connected to an input end of the fifteenth coupler, a first output end of the fifteenth coupler is connected to a first input end of the sixteenth coupler, a first output end of the sixteenth coupler is used as the first output end of the second pump light processing component, and a second output end of the sixteenth coupler is used as the second output end of the second pump light processing component; a first input end of the seventeenth coupler is used as the first input end of the second pump light processing component, and a second input end of the seventeenth coupler is used as the second input end of the second pump light processing component; and a first output end of the seventeenth coupler is connected to a second input end of the sixteenth coupler; and the fourth pump source generates local-end pump lights and sends the local-end pump lights to the input end of the second polarization beam combiner through the output end of the second pump source, and then to the input end of the fifteenth coupler through the output end of the second polarization beam combiner, and the fifteenth coupler couples the local-end pump lights that enter the fifteenth coupler and sends a part of a local-end pump light obtained through coupling to the first input end of the sixteenth coupler; the seventeenth coupler couples the reverse pump light that comes from the eighth coupler and enters the first input end of the seventeenth coupler and the reverse pump light that comes from the optical path of a signal light on a side opposite to the signal light and enters the second input end of the seventeenth coupler, and sends a part of a reverse pump light obtained through coupling to the second input end of the sixteenth coupler through a first output end of the seventeenth coupler; the sixteenth coupler couples the reverse pump light that enters the second input end of the sixteenth coupler and the local-end pump light that enters the first input end of the sixteenth coupler, sends a part of a pump light obtained through coupling to the ninth coupler through the first output end of the sixteenth coupler, and sends another part of the pump light obtained through coupling to the seventh coupler through the second output end of the sixteenth coupler.

With reference to the implementation manner of the second aspect and the first or second possible implementation manner of the second aspect, in a third possible implementation manner, the eighth coupler is a third circulator, where the third circulator is a circulator in which a first port, a second port, and a third port are connected in sequence, where:

the first port of the third circulator is the first input end of the eighth coupler, the second port of the third circulator is the output end of the second coupler, and the third port of the third circulator is the second input end of the second coupler.

With reference to the implementation manner of the second aspect and the first or second possible implementation manner of the second aspect, in a fourth possible implementation manner, the ninth coupler is a fourth circulator; the fourth circulator is a circulator in which a first port, a second port, and a third port are connected in sequence, where:

the first port of the fourth circulator is the second output end of the ninth coupler, the second port of the fourth circulator is the input end of the ninth coupler, and the third port of the fourth circulator is the first output end of the ninth coupler.

With reference to the implementation manner of the second aspect and the first or second possible implementation manner of the second aspect, in a fifth possible implementation manner, a gain flatness filter is further concatenated in an optical path of the signal light.

A third aspect of an embodiment of the present disclosure further provides an optical fiber communications system, including: an optical cable and an optical repeater embedded in the optical cable, where the optical repeater is any optical repeater according to the embodiments of the present disclosure.

It can be seen from the foregoing technical solutions that the embodiments of the present disclosure have the following advantages: if no pump light is output because all local-end pump lights generated by a local end of an optical repeater fail or due to another fault, a reverse pump light from outside of the optical repeater still enters the optical repeater, and a stimulation effect can still be exerted on an erbium doped fiber, so that a signal light is not severely absorbed and even gets a small gain, and therefore a service of an optical communications system can remain uninterrupted. In addition, if an end station provides a reverse Raman pump light, optical repeaters in the first and last spans can also couple a residual Raman pump light from the end station and exert a stimulation effect on the erbium doped fiber. Therefore, reliability of the optical fiber communications system can be improved.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1A is a schematic structural diagram of an optical fiber communications system according to an embodiment of the present disclosure;

FIG. 1B is a schematic structural diagram of an optical fiber communications system according to an embodiment of the present disclosure;

FIG. 2 is a schematic structural diagram of an optical repeater according to an embodiment of the present disclosure;

DESCRIPTION OF EMBODIMENTS

Figure 3:
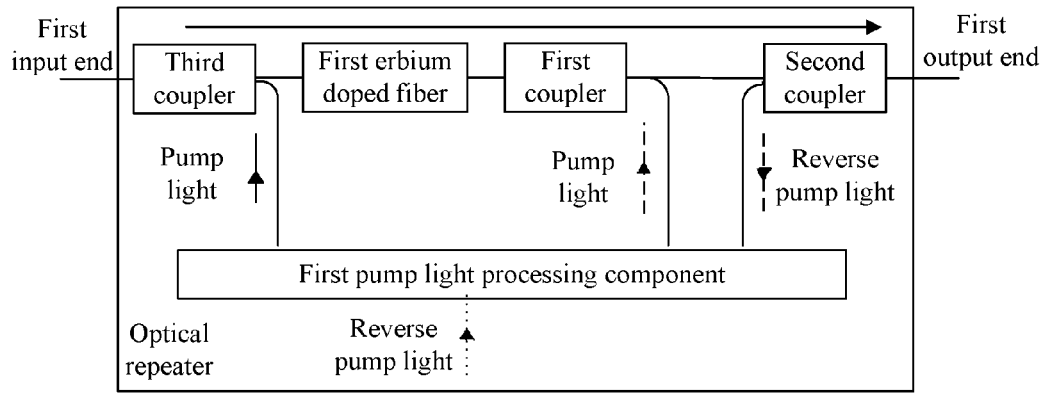
FIG. 3 is a schematic structural diagram of an optical repeater according to an embodiment of the present disclosure.

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A submarine cable optical fiber communications system in the embodiments of the present disclosure is shown in FIG. 1A and FIG. 1B. FIG. 1A is a schematic diagram when all optical repeaters are normal. FIG. 1B is a schematic diagram when an optical repeater fails (an area filled with slashes is the faulty repeater). Two submarine cable end stations (end station A and end station B) are connected by using several optical repeaters and submarine cables and at least one pair of optical fiber transmission links with opposite transmission directions are provided. An optical repeater provides a reverse Raman amplified pump light, couples the pump light to a transmission fiber, and amplifies an optical signal in the transmission fiber by using the Raman effect. A centralized amplifier is also provided within the repeater, and the centralized amplifier uses an erbium doped fiber amplifier technology. In addition, the centralized optical amplifier further provides a Raman pump light coupling channel, which is used to couple a residual Raman pump light from a downstream or upstream repeater to the erbium doped fiber. When no pump in a fiber pair outputs any light due to a fault of one optical repeater in the system (an area filled with slashes in FIG. 1B is the faulty repeater), because the upstream or downstream residual Raman pump light can still exert a stimulation effect on the erbium doped fiber, a signal light is not severely absorbed and even gets a small gain, and a system service can remain uninterrupted. An end station can also provide a reverse Raman pump light, so that optical repeaters in the first and last spans can also couple a residual Raman pump light from the end station.

The following embodiments describe an internal structure of an optical repeater in detail. Each optical repeater in the submarine cable optical fiber communications system in the embodiments of the present disclosure can use any specific structure in the following embodiments.

An optical repeater in an optical cable generally includes at least two optical fibers corresponding to two signal optical paths. In the two signal optical paths, propagation directions of optical signals are opposite. FIG. 1 is used as an example, where a signal light sent from end station A to end station B passes through an optical path, and a signal light sent from end station B to end station A passes through another optical path, where the two optical paths are symmetric. Therefore, in the following embodiments, one optical path is described, and for a structure of another optical path, reference may be made to implementation and details are not described any further in the embodiments of the present disclosure.

An embodiment of the present disclosure provides an optical repeater. As shown in FIG. 2, the optical repeater includes:

a first input end of the optical repeater, a first output end of the optical repeater, a first erbium doped fiber, a first coupler, a second coupler, and a first pump light processing component, where:

the first input end of the optical repeater is connected to an input end of the first erbium doped fiber, an output end of the first erbium doped fiber is connected to an input end of the first coupler, a first output end of the first coupler is connected to a first input end of the second coupler, and an output end of the second coupler is connected to the first output end of the optical repeater; an input end of the first pump light processing component is connected to a second input end of the second coupler; and an output end of the first pump light processing component is connected to a second output end of the first coupler;

reverse pump lights enter the optical repeater through the first output end and enter the second coupler through the output end of the second coupler, and the second coupler couples the reverse pump lights that enter the second coupler and sends a coupled reverse pump light to the input end of the first pump light processing component through the second input end of the second coupler;

a signal light enters the optical repeater through the first input end of the optical repeater, passes through the first erbium doped fiber, the first coupler, and the second coupler in turn, and is finally sent out of the optical repeater through the first output end of the optical repeater; and the output end of the first pump light processing component sends a pump light to the second output end of the first coupler, where the pump light includes a local-end pump light generated by the first pump light processing component and/or the reverse pump lights; and the first coupler sends the pump light received by the second output end of the first coupler to the output end of the first erbium doped fiber through the input end of the first coupler, and enters the first erbium doped fiber through the output end of the first erbium doped fiber.

In this embodiment, the pump light received by the second output end of the first coupler enters the first erbium doped fiber through the output end of the first erbium doped fiber and is partially absorbed by the first erbium doped fiber, so as to amplify the signal light that passes through the first erbium doped fiber; and a part of residual pump lights is output from the input end of the erbium doped fiber and then is output from the first input end of the optical repeater, and is used to stimulate the transmission fiber and perform Raman amplification on the signal light.

In this embodiment of the present disclosure, if no pump light is output because all local-end pump lights generated by a local end of an optical repeater fail or due to another fault, a reverse pump light from outside of the optical repeater still enters the optical repeater, and a stimulation effect can still be exerted on an erbium doped fiber, so that a signal light is not severely absorbed and even gets a small gain, and therefore a service of an optical communications system can remain uninterrupted. In addition, if an end station provides a reverse Raman pump light, optical repeaters in the first and last spans can also couple a residual Raman pump light from the end station and exert a stimulation effect on the erbium doped fiber.

As shown in FIG. 3, based on the optical repeater shown in FIG. 2, the optical repeater further includes a third coupler, where the output end of the first pump light processing component includes a first output end of the first pump light processing component and a second output end of the first pump light processing component;

an input end of the third coupler is connected to the first input end of the optical repeater, and a first output end of the third coupler is connected to the input end of the first erbium doped fiber; a second output end of the third coupler is connected to the second output end of the first pump light processing component; and the second output end of the first coupler is connected to the first output end of the first pump light processing component;

the second output end of the first pump light processing component sends a pump light to the second output end of the third coupler; and the third coupler sends the pump light received by the second output end of the third coupler to the first input end of the optical repeater through the input end of the third coupler; and the first output end of the first pump light processing component sends a pump light to the second output end of the first coupler; and the first coupler sends the pump light received by the second output end of the first coupler to the output end of the first erbium doped fiber through the input end of the first coupler.

Figure 4:
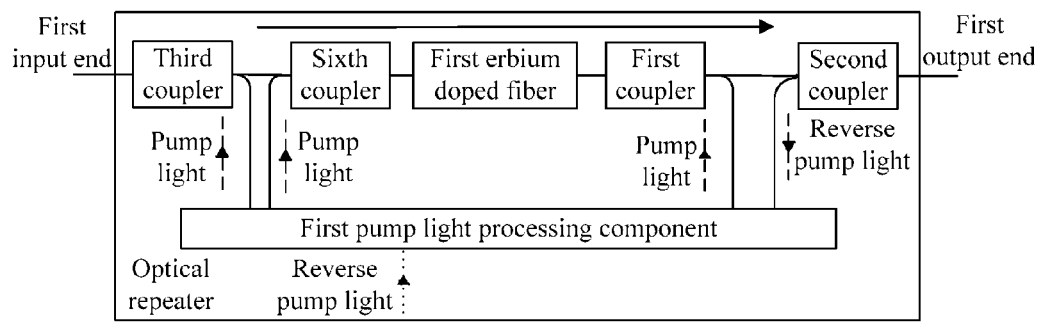
FIG. 4 is a schematic structural diagram of an optical repeater according to an embodiment of the present disclosure.

As shown in FIG. 4, based on the optical repeater shown in FIG. 3, the optical repeater further includes a sixth coupler, where the output end of the first pump light processing component further includes a third output end of the first pump light processing component, where:

the sixth coupler is located in an optical path of a signal light between the third coupler and the first erbium doped fiber; the first output end of the third coupler is connected to a first input end of the sixth coupler, the third output end of the first pump light processing component is connected to a second input end of the sixth coupler, and an output end of the sixth coupler is connected to the input end of the first erbium doped fiber; and the third output end of the first pump light processing component sends a pump light to the second input end of the sixth coupler; and the sixth coupler sends the pump light received by the second input end of the sixth coupler to the input end of the first erbium doped fiber through the output end of the sixth coupler.

Figure 5:
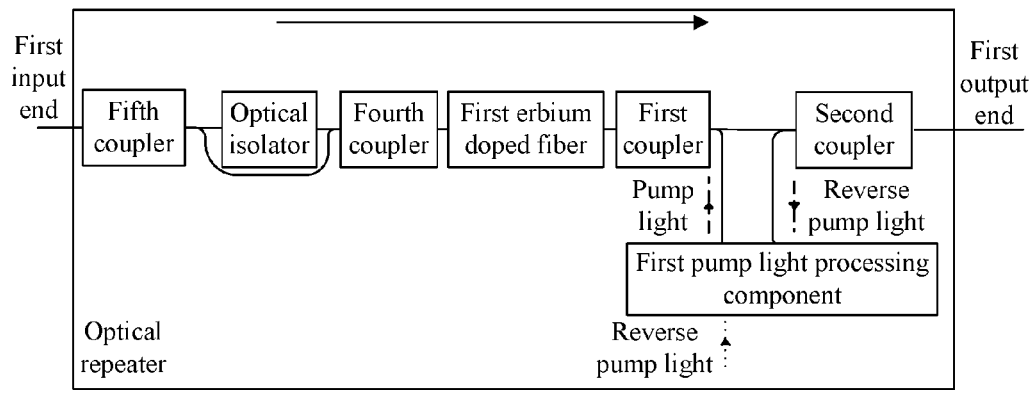
FIG. 5 is a schematic structural diagram of an optical repeater according to an embodiment of the present disclosure.

As shown in FIG. 5, based on the optical repeater shown in FIG. 2, the optical repeater further includes a fourth coupler, an optical isolator, and a fifth coupler, where:

the fourth coupler, the optical isolator, and the fifth coupler are connected in turn in an optical path of a signal light between the optical repeater and the first erbium doped fiber; and an input end of the fifth coupler is connected to the first input end of the optical repeater, a first output end of the fifth coupler is connected to an input end of the optical isolator, an output end of the optical isolator is connected to a first input end of the fourth coupler, and a second output end of the fifth coupler is connected to a second input end of the fourth coupler; and after the pump light that enters the first erbium doped fiber amplifies the signal light that passes through the first erbium doped fiber, a residual pump light that is of a pump and enters the first erbium doped fiber is sent to an output end of the fourth coupler through the output end of the first erbium doped fiber, the fourth coupler sends the residual pump light received by the output end of the fourth coupler to the second output end of the fifth coupler through the second input end of the fourth coupler, and the fifth coupler sends the residual pump light received by the output end of the fifth coupler to the first input end of the optical repeater through the input end of the fifth coupler.

In the foregoing embodiment, there is one input end of the first pump light processing component. In another optional solution, there may be another input end of the first pump light processing component, for example, a reverse pump light is input in a direction of an arrow in a dotted line shown in FIG. 2 to FIG. 4, where the reverse pump light is a pump light opposite to a propagation direction of a signal light, and a source of the reverse pump light may be on one side of a signal optical path shown in FIG. 2 to FIG. 4, or may be on one side opposite to the optical path or a combination of the two. Therefore, the reverse pump light that is input in the direction of the arrow in the dotted line shown in FIG. 2 to FIG. 4 is not mandatory and should not be understood as a mandatory constituent part of the optical repeater in this embodiment of the present disclosure. Optionally, the input end of the first pump light processing component includes a first input end of the first pump light processing component and a second input end of the first pump light processing component, where:

the first input end of the first pump light processing component is a port that is of the first pump light processing component and that is connected to the second input end of the second coupler; and the second input end of the first pump light processing component receives a reverse pump light that comes from an optical path of a signal light on a side opposite to the signal light.

Figure 6A:
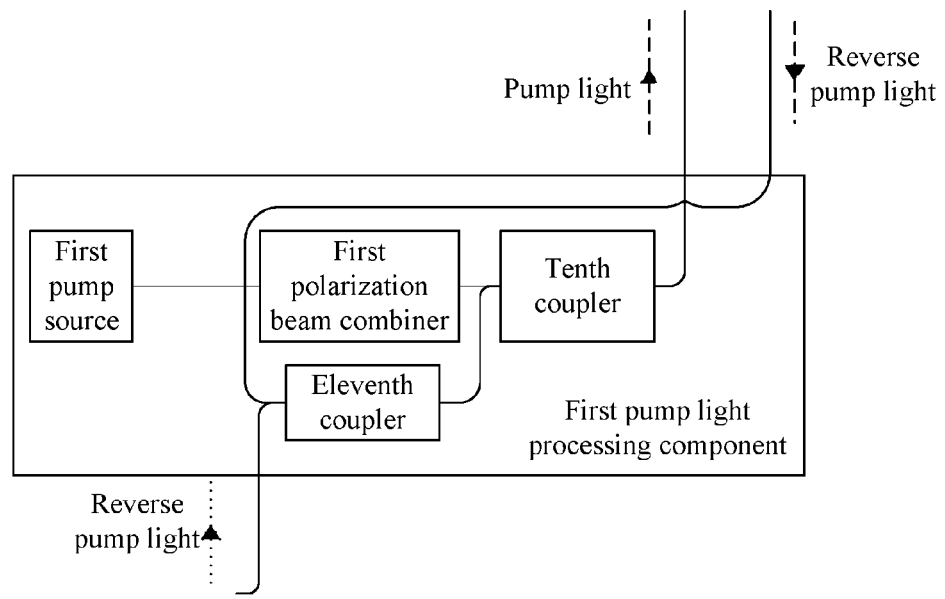
FIG. 6A is a schematic structural diagram of a first pump light processing component according to an embodiment of the present disclosure.

In the foregoing embodiment, a function of the first pump light processing component and propagation of a pump light in the first pump light processing component are limited. Any structure of a first pump light processing component that can implement the foregoing function is appropriate and is not uniquely limited in this embodiment of the present disclosure. It should also be noted that in this embodiment of the present disclosure, a pump light that is output from an output end of a pump light processing component (including a first pump light processing component and a second pump light processing component) may include a reverse pump light and/or a pump light generated by the local end. The following embodiment uses several exemplary structures as examples for description:

(1) As shown in FIG. 6A, the structure of the first pump light processing component may be applied to the optical repeater shown in FIG. 2 or FIG. 5 and is specifically as follows:

If the input end of the first pump light processing component includes a first input end of the first pump light processing component and a second input end of the first pump light processing component, where the first input end of the first pump light processing component is a port that is of the first pump light processing component and that is connected to the second input end of the second coupler, and the second input end of the first pump light processing component receives a reverse pump light that comes from an optical path of a signal light on a side opposite to the signal light.

The first pump light processing component includes a first pump source, a first polarization beam combiner, a tenth coupler, an eleventh coupler; the first pump source may include 2N pump lasers, where N≥1; and a polarization beam combiner generally includes two input ends.

An output end of the first pump source is connected to an input end of the first polarization beam combiner, an output end of the first polarization beam combiner is connected to a first input end of the tenth coupler, and a first output end of the tenth coupler is used as the output end of the first pump light processing component.

A first input end of the eleventh coupler is used as the first input end of the first pump light processing component, a second input end of the eleventh coupler is used as the second input end of the first pump light processing component, and a first output end of the eleventh coupler is connected to a second input end of the tenth coupler.

The first pump source generates a local-end pump light and sends the local-end pump light to the input end of the first polarization beam combiner, and the first polarization beam combiner sends the local-end pump light that enters the input end of the first polarization beam combiner to the first input end of the tenth coupler through the output end of the first polarization beam combiner; the eleventh coupler couples a reverse pump light that enters from the first input end of the eleventh coupler and a reverse pump light that enters from the second input end of the eleventh coupler, and sends, from the first output end of the eleventh coupler to the second input end of the tenth coupler, a part of a reverse pump light obtained through coupling; and the tenth coupler couples the local-end pump light that enters from the first input end of the tenth coupler and the reverse pump light that enters from the second input end of the tenth coupler, and outputs, from the first output end of the tenth coupler, a part of pump light obtained through coupling.

In addition, in FIG. 6A, a pump light that is output from a second output end of the tenth coupler is sent to an optical path that is symmetric to a signal optical path shown in FIG. 2 or FIG. 5.

In this embodiment of the present disclosure, the polarization beam combiner is used to couple two linearly polarized lights that are vertical to each other to a same port for output. In a Raman amplifier, a Raman gain has dependence in a polarization direction of a pump light. Two linearly polarized lights whose polarization directions are vertical to each other are combined as a Raman pump light by using a polarization beam combiner (PBC), which decreases a polarization degree, thereby effectively decreasing a polarization-related gain of the Raman amplifier. In this embodiment of the present disclosure, two linearly polarized lights whose polarization directions are vertical to each other are combined as a Raman pump light by using a PBC, which decreases a polarization degree, thereby effectively decreasing a polarization-related gain of the Raman amplifier.

Figure 6B:
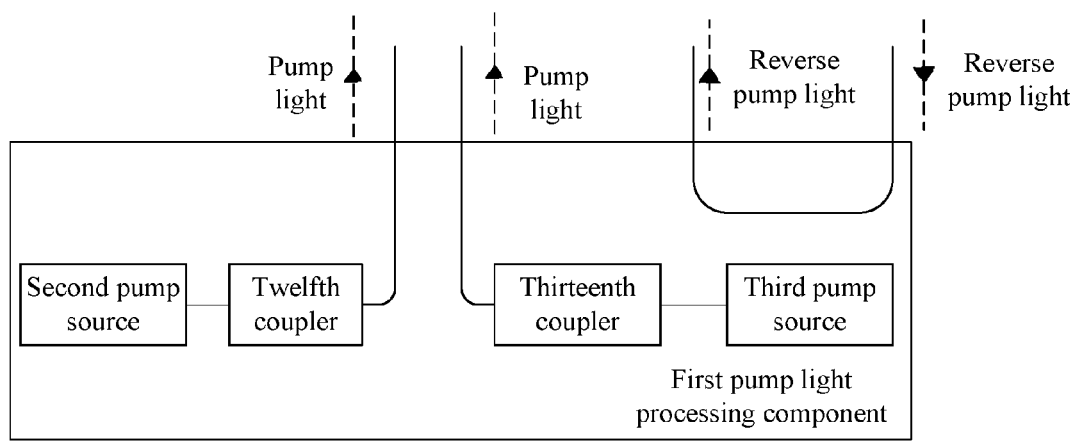
FIG. 6B is a schematic structural diagram of a first pump light processing component according to an embodiment of the present disclosure.
Figure 6C:
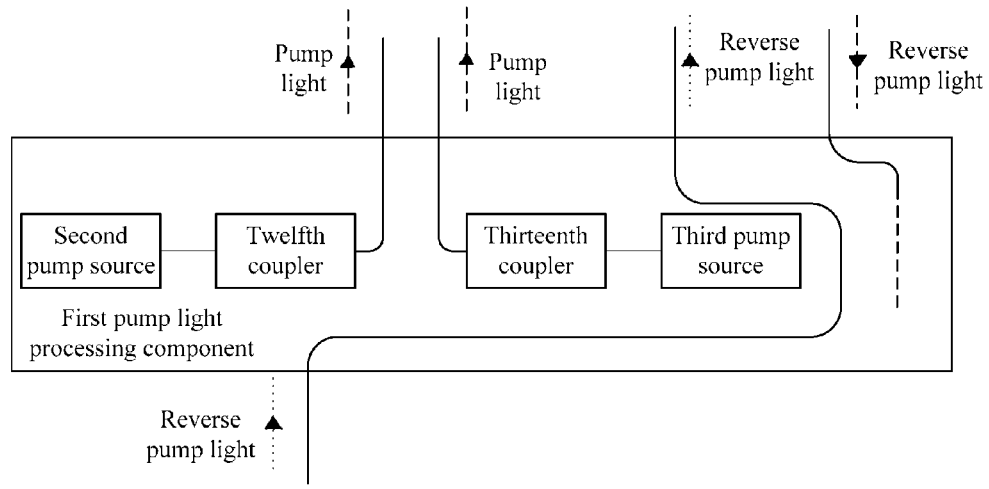
FIG. 6C is a schematic structural diagram of a first pump light processing component according to an embodiment of the present disclosure.

(2) As shown in FIG. 6B and FIG. 6C, the structures of the first pump light processing component may be applied to the optical repeater shown in FIG. 3 or FIG. 4 and are specifically as follows:

A common part of the structures shown in FIG. 6B and FIG. 6C is as follows: the first pump light processing component includes a second pump source, a third pump source, a twelfth coupler, and a thirteenth coupler.

An output end of the second pump source is connected to an input end of the twelfth coupler, and a first output end of the twelfth coupler is used as the second output end of the first pump light processing component; and an output end of the third pump source is connected to an input end of the thirteenth coupler, and a first output end of the thirteenth coupler is used as the third output end of the first pump light processing component.

The second pump source generates first local-end pump lights and sends the first local-end pump lights to the input end of the twelfth coupler through the output end of the second pump source, and the twelfth coupler couples the first local-end pump lights that enter the input end of the twelfth coupler, and outputs, from the first output end of the twelfth coupler, a part of a first local-end pump light obtained through coupling.

The third pump source generates second local-end pump lights and sends the second local-end pump lights to the input end of the thirteenth coupler through the output end of the third pump source, and the thirteenth coupler couples the second local-end pump lights that enter the input end of the thirteenth coupler, and outputs, from the first output end of the thirteenth coupler, a part of a second local-end pump light obtained through coupling.

The structure shown in FIG. 6B is different from that shown in FIG. 6C as follows: The reverse pump light from the second output end of the second coupler enters from the input end of the first pump light processing component and is directly output to the second output end of the first coupler from the first output end of the first pump light processing component.

The structure shown in FIG. 6C is different from that shown in FIG. 6B as follows: If the input end of the first pump light processing component includes a first input end of the first pump light processing component and a second input end of the first pump light processing component, the first input end of the first pump light processing component is a port that is of the first pump light processing component and that is connected to the second input end of the second coupler, the second input end of the first pump light processing component receives a reverse pump light that comes from an optical path of a signal light on a side opposite to the signal light, and the reverse pump light that comes from the optical path of a signal light on a side opposite to the signal light is directly output to the second output end of the first coupler from the first output end of the first pump light processing component.

In addition, in FIG. 6B and FIG. 6C, a local-end pump light that is output from a second output end of the twelfth coupler is sent to the optical path that is symmetric to the signal optical path shown in FIG. 2 or FIG. 5; and a local-end pump light that is output from a second output end of the thirteenth coupler is sent to the optical path that is symmetric to the signal optical path shown in FIG. 2 or FIG. 5. The second output end of the twelfth coupler and the second output end of the thirteenth coupler are symmetric to the first output end of the twelfth coupler and the first output end of the thirteenth coupler.

In FIG. 6C, an output manner of a reverse pump light that enters from the first input end of the first pump light processing component may also be symmetric to an output manner of a reverse pump light that enters from the second input end of the first pump light processing component.

Figure 6D:
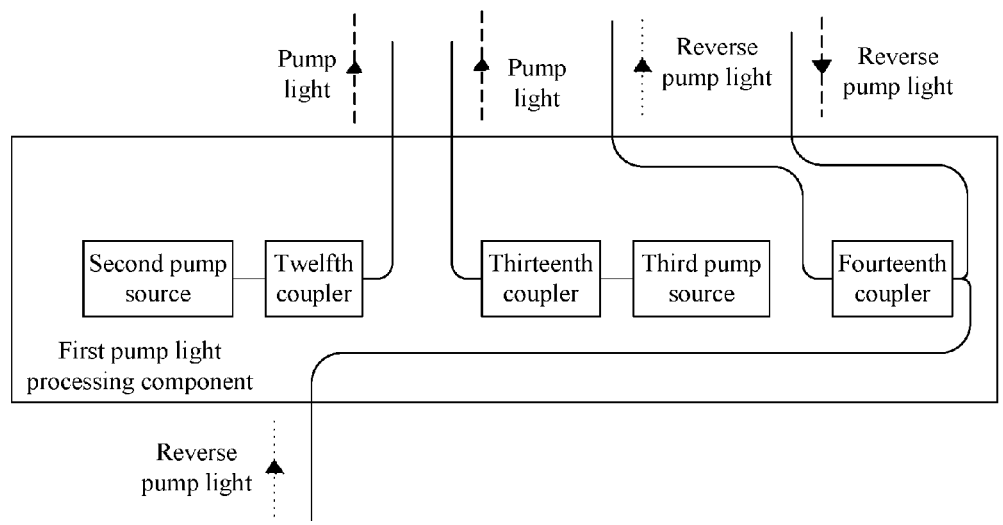
FIG. 6D is a schematic structural diagram of a first pump light processing component according to an embodiment of the present disclosure.

(3) As shown in FIG. 6D, the structure of the first pump light processing component may be applied to the optical repeater shown in FIG. 3 or FIG. 4 and is specifically as follows:

If the input end of the first pump light processing component includes the first input end of the first pump light processing component and the second input end of the first pump light processing component, the first pump light processing component further includes a fourteenth coupler, where:

a first input end of the fourteenth coupler is used as the first input end of the first pump light processing component, a second input end of the fourteenth coupler is used as the second input end of the first pump light processing component, and a first output end of the fourteenth coupler is used as the first output end of the first pump light processing component; and the fourteenth coupler couples the reverse pump light that comes from the second coupler and enters the first input end of the fourteenth coupler and the reverse pump light that comes from the optical path of a signal light on a side opposite to the signal light and enters the second input end of the fourteenth coupler, and sends a part of a reverse pump light obtained through coupling to the second output end of the first coupler through the first output end of the fourteenth coupler.

In addition, in FIG. 6D, a local-end pump light that is output from a second output end of the twelfth coupler is sent to the optical path that is symmetric to the signal optical path shown in FIG. 4; and a local-end pump light that is output from a second output end of the thirteenth coupler is sent to the optical path that is symmetric to the signal optical path shown in FIG. 2 or FIG. 5. The second output end of the twelfth coupler and the second output end of the thirteenth coupler are symmetric to the first output end of the twelfth coupler and the first output end of the thirteenth coupler.

In theory, all couplers (except the sixth coupler) shown in FIG. 2 to FIG. 5 may be substituted by circulators. In addition, in optical paths shown in FIG. 2 to FIG. 6D, an optical isolator may further be included to ensure that an optical path is unidirectional, which is not strictly limited in this embodiment of the present disclosure. Two cases in which an optical isolator may be preferably substituted by a circulator are specifically as follows:

Optionally, the second coupler is a first circulator, where the first circulator is a circulator in which a first port, a second port, and a third port are connected in sequence, where:

the first port of the first circulator is the first input end of the second coupler, the second port of the first circulator is the output end of the second coupler, and the third port of the first circulator is the second input end of the second coupler.

Optionally, the third coupler is a second circulator, where the second circulator is a circulator in which a first port, a second port, and a third port are connected in sequence, where:

the first port of the second circulator is the second output end of the third coupler, the second port of the second circulator is the input end of the third coupler, and the third port of the second circulator is the first output end of the third coupler.

Preferably, in the optical repeater shown in FIG. 2 to FIG. 4, a gain flatness filter is further concatenated in an optical path of the signal light.

Figure 7:
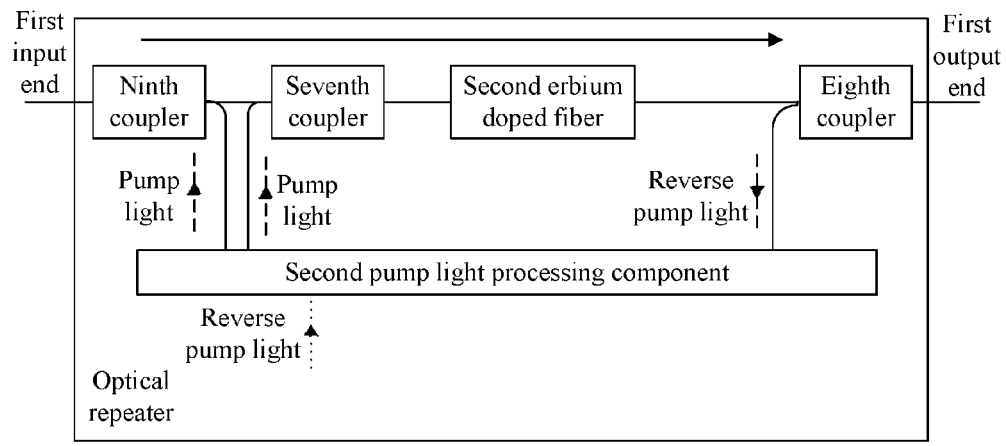
FIG. 7 is a schematic structural diagram of an optical repeater according to an embodiment of the present disclosure.

An embodiment of the present disclosure further provides an optical repeater. As shown in FIG. 7, the optical repeater includes:

a first input end of the optical repeater, a first output end of the optical repeater, a second erbium doped fiber, a seventh coupler, an eighth coupler, a ninth coupler, and a second pump light processing component, where:

the first input end of the optical repeater is connected to an input end of the ninth coupler, a first output end of the ninth coupler is connected to a first input end of the seventh coupler, an output end of the seventh coupler is connected to the second erbium doped fiber, an output end of the second erbium doped fiber is connected to a first input end of the eighth coupler, and an output end of the eighth coupler is connected to the output end of the optical repeater; an input end of the second pump light processing component is connected to a second input end of the eighth coupler; and a first output end of the second pump light processing component is connected to a second output end of the ninth coupler, and a second output end of the second pump light processing component is connected to a second input end of the seventh coupler;

reverse pump lights enter the optical repeater through the first output end and enter the eighth coupler through the output end of the eighth coupler, and the eighth coupler couples the reverse pump lights that enter the eighth coupler and sends a coupled reverse pump light to the input end of the second pump light processing component through the second input end of the eighth coupler;

a signal light enters the optical repeater through the first input end of the optical repeater, passes through the ninth coupler, the seventh coupler, the second erbium doped fiber, and the eighth coupler in turn, and is finally sent out of the optical repeater through the first output end of the optical repeater; and the first output end of the second pump light processing component sends a pump light to the second output end of the ninth coupler; the second output end of the second pump light processing component sends a pump light to the second input end of the seventh coupler, where the pump light includes a local-end pump light generated by the first pump light processing component and/or the reverse pump lights; the pump light that enters the second output end of the ninth coupler is sent out of the optical repeater from the first input end of the optical repeater through the input end of the ninth coupler; and the pump light that enters the second input end of the seventh coupler is coupled by the seventh coupler and is sent to an input end of the second erbium doped fiber through the output end of the seventh coupler.

In this embodiment, the pump light received by the input end of the second erbium doped fiber enters the second erbium doped fiber and is partially absorbed by the second erbium doped fiber, so as to amplify a signal light that passes through the second erbium doped fiber.

In this embodiment of the present disclosure, if no pump light is output because all local-end pump lights generated by a local end of an optical repeater fail or due to another fault, a reverse pump light from outside of the optical repeater still enters the optical repeater, and a stimulation effect can still be exerted on an erbium doped fiber, so that a signal light is not severely absorbed and even gets a small gain, and therefore a service of an optical communications system can remain uninterrupted. In addition, if an end station provides a reverse Raman pump light, optical repeaters in the first and last spans can also couple a residual Raman pump light from the end station and exert a stimulation effect on the erbium doped fiber.

In the foregoing embodiment, there is one input end of the first pump light processing component. In another optional solution, there may be another input end of the first pump light processing component, for example, a reverse pump light is input in a direction of an arrow in a dotted line shown in FIG. 7, where the reverse pump light is a pump light opposite to a propagation direction of a signal light, and a source of the reverse pump light may be on one side of a signal optical path shown in FIG. 7, or may be on one side opposite to the optical path or a combination of the two. Therefore, the reverse pump light that is input in the direction of the arrow in the dotted line shown in FIG. 7 is not mandatory and should not be understood as a mandatory constituent part of the optical repeater in this embodiment of the present disclosure. Optionally, the input end of the second pump light processing component includes a first input end of the second pump light processing component and a second input end of the second pump light processing component, where:

the first input end of the second pump light processing component is a port that is of the second pump light processing component and that is connected to the second input end of the eighth coupler; and the second input end of the second pump light processing component receives a reverse pump light that comes from an optical path of a signal light on a side opposite to the signal light.

Figure 8:
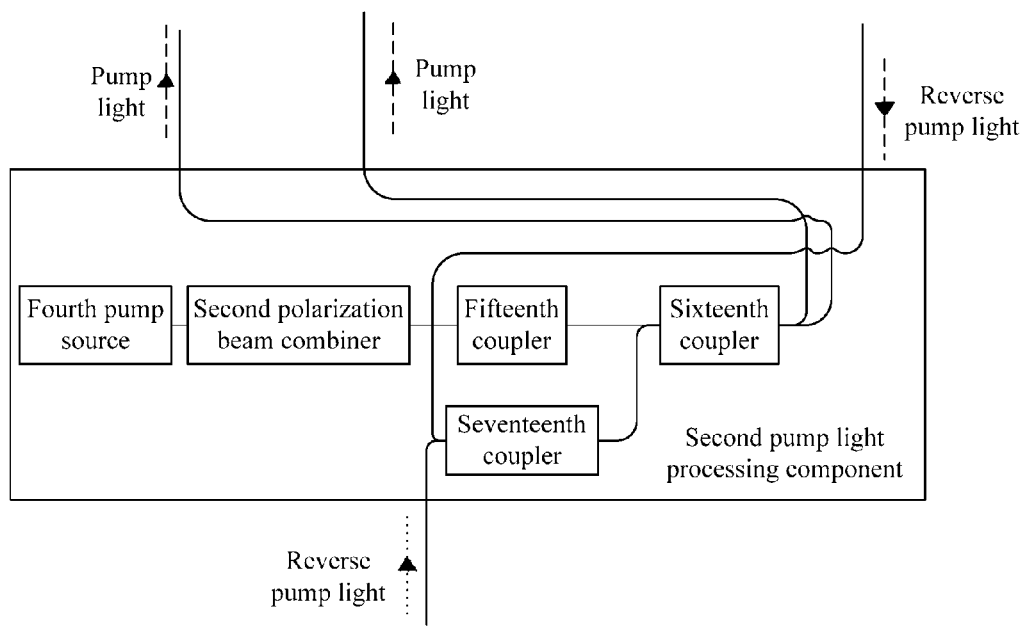
FIG. 8 is a schematic structural diagram of a second pump light processing component according to an embodiment of the present disclosure.

In the foregoing embodiment, a function of the first pump light processing component and propagation of a pump light in the first pump light processing component are limited. Any structure of a first pump light processing component that can implement the foregoing function is appropriate and is not uniquely limited in this embodiment of the present disclosure. The following embodiment uses several exemplary structures as examples for description:

(4) As shown in FIG. 8, the structure of the first pump light processing component may be applied to the optical repeater shown in FIG. 7 and is specifically as follows:

The second pump light processing component includes a fourth pump source, a second polarization beam combiner, a fifteenth coupler, a sixteenth coupler, and a seventeenth coupler; the second pump source may include 2N pump lasers, where N≥1; and a polarization beam combiner generally includes two input ends.

An output end of the fourth pump source is connected to an input end of the second polarization beam combiner, an output end of the second polarization beam combiner is connected to an input end of the fifteenth coupler, a first output end of the fifteenth coupler is connected to a first input end of the sixteenth coupler, a first output end of the sixteenth coupler is used as the first output end of the second pump light processing component, and a second output end of the sixteenth coupler is used as the second output end of the second pump light processing component; a first input end of the seventeenth coupler is used as the first input end of the second pump light processing component, and a second input end of the seventeenth coupler is used as the second input end of the second pump light processing component; and a first output end of the seventeenth coupler is connected to a second input end of the sixteenth coupler.

The fourth pump source generates local-end pump lights and sends the local-end pump lights to the input end of the second polarization beam combiner through the output end of the second pump source, and then to the input end of the fifteenth coupler through the output end of the second polarization beam combiner, and the fifteenth coupler couples the local-end pump lights that enter the fifteenth coupler and sends a part of a local-end pump light obtained through coupling to the first input end of the sixteenth coupler; the seventeenth coupler couples the reverse pump light that comes from the eighth coupler and enters the first input end of the seventeenth coupler and the reverse pump light that comes from the optical path of a signal light on a side opposite to the signal light and enters the second input end of the seventeenth coupler, and sends a part of a reverse pump light obtained through coupling to the second input end of the sixteenth coupler through a first output end of the seventeenth coupler; the sixteenth coupler couples the reverse pump light that enters the second input end of the sixteenth coupler and the local-end pump light that enters the first input end of the sixteenth coupler, sends a part of a pump light obtained through coupling to the ninth coupler through the first output end of the sixteenth coupler, and sends another part of the pump light obtained through coupling to the seventh coupler through the second output end of the sixteenth coupler.

In addition, in FIG. 8, a second output end of the fifteenth coupler may output a local-end pump light, and a second output end of the seventeenth coupler may output a reverse pump light. The two pump lights may be coupled by another coupler, and input of a pump light is implemented by using a structure that is symmetric to the sixteenth coupler for an optical path that is symmetric to an optical path of a signal light shown in FIG. 7.

In FIG. 6A to FIG. 6D, and FIG. 8, in a pump light processing component, a wavelength of a pump light generated by a pump source (including a first pump source, a second pump source, a third pump source, and a fourth pump source) may be set according to a requirement. To cover more amplification bandwidths, more pump sources may further be added, which is not uniquely limited in this embodiment of the present disclosure.

In theory, all couplers shown in FIG. 7 to FIG. 8 may be substituted by circulators. In addition, in optical paths shown in FIG. 7 to FIG. 8, an optical isolator may further be included to ensure that an optical path is unidirectional, which is not strictly limited in this embodiment of the present disclosure. Two cases in which an optical isolator may be preferably substituted by a circulator are specifically as follows:

Optionally, the eighth coupler is a third circulator, where the third circulator is a circulator in which a first port, a second port, and a third port are connected in sequence, where:

the first port of the third circulator is the first input end of the eighth coupler, the second port of the third circulator is the output end of the second coupler, and the third port of the third circulator is the second input end of the second coupler.

Optionally, the ninth coupler is a fourth circulator, where the fourth circulator is a circulator in which a first port, a second port, and a third port are connected in sequence, where:

the first port of the fourth circulator is the second output end of the ninth coupler, the second port of the fourth circulator is the input end of the ninth coupler, and the third port of the fourth circulator is the first output end of the ninth coupler.

Preferably, in the optical repeater shown in FIG. 2 to FIG. 4, a gain flatness filter is further concatenated in an optical path of the signal light.

In this embodiment of the present disclosure, after a pump light is generated by a pump light source, the pump light has two usages, one is that the pump light is used as a Raman pump light, and the other one is that the pump light is sent to an EDF and used as an EDF pump light. In the description of a propagation direction of a light in this embodiment of the present disclosure, the pump light is not functionally differentiated.

1.

Figure 9:
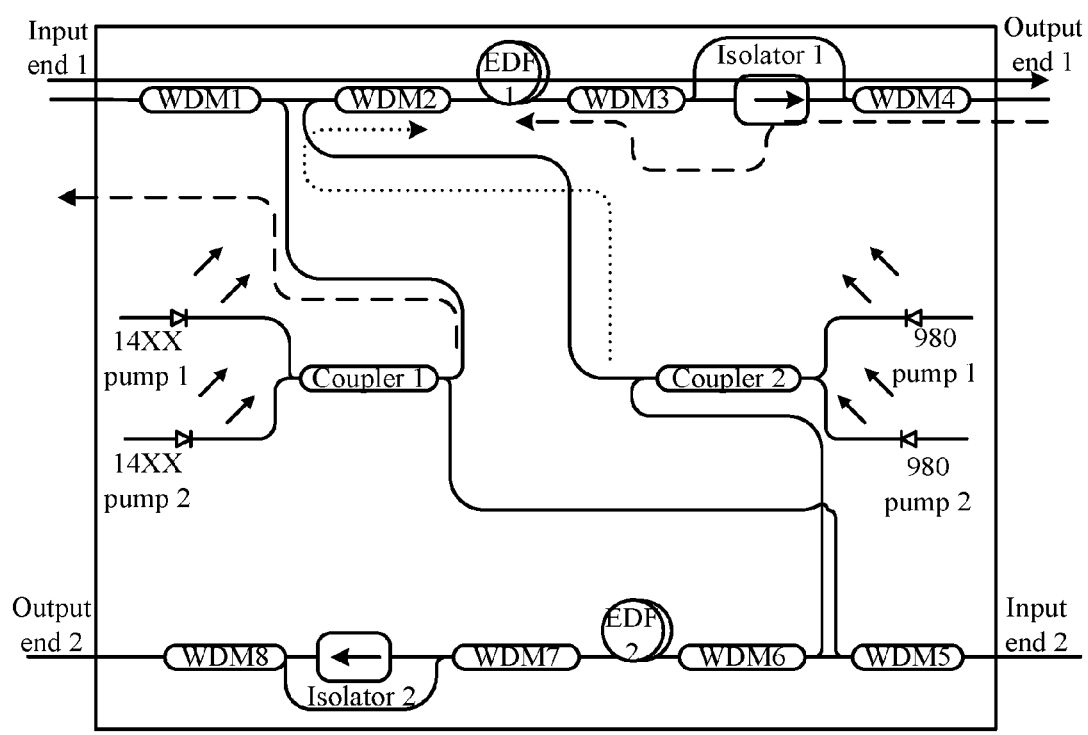
FIG. 9 is a schematic structural diagram of an optical repeater according to an embodiment of the present disclosure.

An embodiment of the present disclosure provides an optical repeater structure shown in FIG. 9. The structure in this embodiment may be corresponding to a combination of FIG. 4 and FIG. 6B in the foregoing embodiment.

The optical repeater includes: a wavelength division multiplexer (WDM), an EDF, a coupler, an optical isolator, and pump sources of 14XX nm pumps and 980 nm pumps. In FIG. 9, two input ends (input end 1 and input end 2) and two output ends (output end 1 and output end 2) are corresponding to a pair of optical paths with opposite directions respectively, and the two are symmetric. In this embodiment, one optical path is described, and the other optical path is not described any further.

In FIG. 9, among WDM1 to WDM8, WDM1 to WDM4 belong to an upper optical path; between EDF1 and EDF2, EDF1 belongs to the upper optical path; between Isolator 1 and Isolator 2, Isolator 1 belongs to the upper optical path; and the pump sources of the 14XX nm pumps and the 980 nm pumps are shared in the two optical paths. In the upper optical path, a connection relationship of the components is as follows:

an input end of WDM1 is connected to input end 1, output end 1 of WDM1 is connected to input end 1 of WDM2, an output end of WDM1 is connected to input end 1 of WDM2, an output end of WDM2 is connected to an input end of EDF1, an output end of EDF1 is connected to an input end of WDM3, output end 1 of WDM3 is connected to an input end of Isolator 1, an output end of Isolator 1 is connected to input end 1 of WNM4, and an output end of WNM4 is connected to output end 1;

input end 2 of WDM4 is connected to output end 2 of WDM3;

14XX nm pump source 1 and 14XX nm pump source 2 are connected to input end 1 and input end 2 of coupler 1 respectively, output end 1 of coupler 1 is connected to output end 2 of WDM1; and 980 nm pump source 1 and 980 nm pump source 2 are connected to input end 1 and input end 2 of coupler 2 respectively, and output end 1 of coupler 2 is connected to input end 2 of WDM2.

The following describes light propagation directions in detail.

In FIG. 9, a direction of a solid-line arrow is a propagation direction of a signal light, a direction of a dashed-line arrow is a propagation direction of a reverse pump light, and a direction of a dotted line arrow is a propagation direction of a forward pump light. The reverse pump light is a pump light whose propagation direction is opposite to a propagation direction of a signal light, and the forward pump light is a pump light whose propagation direction is the same as a propagation direction of a signal light.

A propagation direction of a pump light is as follows:

14XX nm pump lights are separately generated by 14XX nm pump source 1 and 14XX nm pump source 2 and enter input end 1 and input end 2 of coupler 1 respectively; coupler 1 couples the input pump lights and outputs coupled pump lights from output end 1 and output end 2 of coupler 1, where the pump light that is output from output end 1 of coupler 1 enters output end 2 of WDM1, and the pump light that enters from output end 2 of WDM1 passes through WDM1 and is sent out from the input end of WDM1. The pump light exerts stimulation on a transmission fiber, so that the signal light is amplified under a stimulated Raman scattering effect, and is sent into an optical repeater in the submarine cable optical fiber communications system along a direction of input end 1.

980 nm pump lights are separately generated by 980 nm pump source 1 and 980 nm pump light source 2 and enter input end 1 and input end 2 of coupler 2 respectively; and coupler 2 couples the input pump lights, and outputs coupled pump lights from output end 1 and output end 2 of coupler 2, where the pump light that is output from output end 1 of coupler 2 enters input end 2 of WDM2.

A propagation direction of a signal light is as follows: a signal light enters an optical repeater from input end 1, enters the input end of WDM1, passes through WDM1, and enters input end 1 of WDM2 through output end 1 of WDM1; WDM2 outputs, from the output end of WDM2 to the input end of EDF1, the signal light that is input from input end 1 of WDM2 and the pump light that is input from input end 2 of WDM2; the pump light that enters EDF1 amplifies the signal light that enters EDF1, and an amplified signal light is output from the output end of EDF1 to the input end of WDM3; WDM3 outputs, from output end 1 of WDM3 to the input end of Isolator 1, the optical signal that is input from the input end of WDM3; Isolator 1 allows the signal light that is input from the input end of Isolator 1 to pass, and outputs the signal light from the output end of Isolator 1 to input end 1 of WDM4; and WDM4 outputs the signal light that enters the input end 1 of WDM4 to output end 1 from the output end of WDM4.

In FIG. 9, a reverse pump light that enters from output end 1 comes from a next optical repeater in the submarine cable optical fiber communications system, and a propagation direction of the reverse pump light is as follows:

The reverse pump light that comes from the next optical repeater in the submarine cable optical fiber communications system enters the output end of WDM4 through output end 1; WDM4 sends out, from input end 2 of WDM4, the reverse pump light that enters from the output end of WDM4; the reverse pump light that is sent out from input end 2 of WDM4 enters output end 2 of WDM3; WDM3 sends out, from the input end of WDM3, the reverse pump light that enters from output end 2 of WDM3; the reverse pump light that is sent out from the input end of WDM3 enters the output end of EDF1; and the reverse pump light that enters from the output end of EDF1 amplifies the signal light that passes through EDF1.

In the foregoing embodiment, a wavelength of a pump light of 14XX nm wave band ranges from 1400 nm to 1500 nm, and preferably from 1450 nm to 1460 nm. In the foregoing embodiment, a pump light of 14XX nm wave band is coupled into a transmission fiber in a reverse manner, stimulates the transmission fiber, and amplifies a signal light by using a stimulated Raman scattering effect; in addition, a pump light of 980 nm wave band (or it may be 14XX pump light) is also coupled into an erbium doped fiber inside the repeater, stimulates erbium ions, and amplifies the signal light by using a stimulated radiation principle. The foregoing Isolator 1 is a component of a one-way signal wave band and is used to isolate a reverse noise light in a signal light wave band. In the structure of the foregoing embodiment, a coupling channel for a reverse residual pump light is also provided (an implementation manner in FIG. 9 is that WDM4 is used in front of or behind the one-way component to connect to a bypass channel) and is used to couple, residual Raman pump lights that are output by a downstream or upstream repeater, and input a coupled pump light to the erbium doped fiber.

Figure 10:
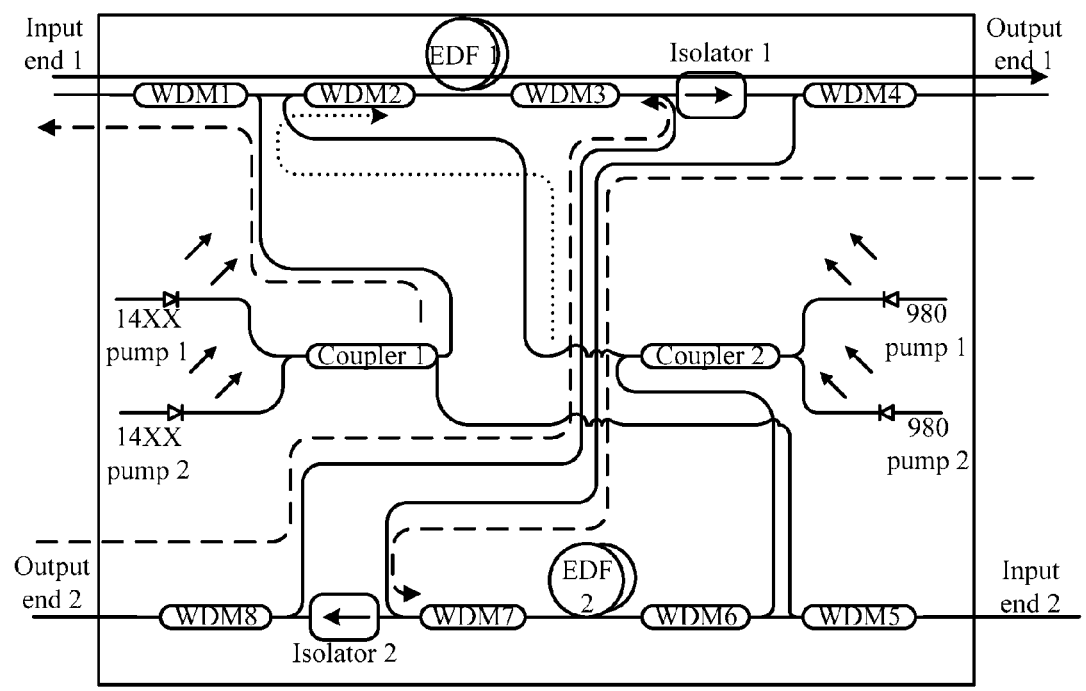
FIG. 10 is a schematic structural diagram of an optical repeater according to an embodiment of the present disclosure.

A structure shown in FIG. 10 may be corresponding to a combination of FIG. 4 and FIG. 6C in the foregoing embodiment. A difference lies in that: structures shown in FIG. 10 and FIG. 9 are basically consistent, but paths of reverse pump lights that come from a next optical repeater in the submarine cable optical fiber communications system are different, and the difference in the paths is caused by a difference in providing a coupling channel for a reverse residual pump light. In FIG. 10, input end 2 of WDM4 is connected to output end 2 of WDM7, and input end 2 of WDM8 is connected to output end 2 of WDM3. That is, a reverse pump light of an EDF comes from an optical path on an opposite side. An upper optical path of an entered reverse pump light is still used as an example:

A change in the structure is as follows:

A reverse pump light that enters from output end 1 enters WDM4 through the output end of WDM4; WDM4 isolates the reverse pump light that enters WDM4 and sends the reverse pump light to output end 2 of WDM8 on the opposite side, and the reverse pump light enters output end 2 of WDM7; WDM 7 sends, from an input end of WDM7 to an output end of EDF2, the reverse pump light that enters output end 2 of WDM 7; and the reverse pump light that enters from the output end of EDF 2 amplifies a signal light that passes through EDF2.

A change in the optical path is as follows:

The reverse pump light enters the output end of WDM4 through output end 1; WDM4 sends out, from input end 2 of WDM4, the reverse pump light that comes from the output end of WDM4; the reverse pump light that is sent out from input end 2 of WDM4 enters output end 2 of WDM3; WDM3 sends out, from the input end of WDM3, the reverse pump light that enters from output end 2 of WDM3; the reverse pump light that is sent out from the input end of WDM3 enters the output end of EDF1; and the reverse pump light that enters from the output end of EDF1 amplifies the signal light that passes through EDF1.

2.

Figure 11A:
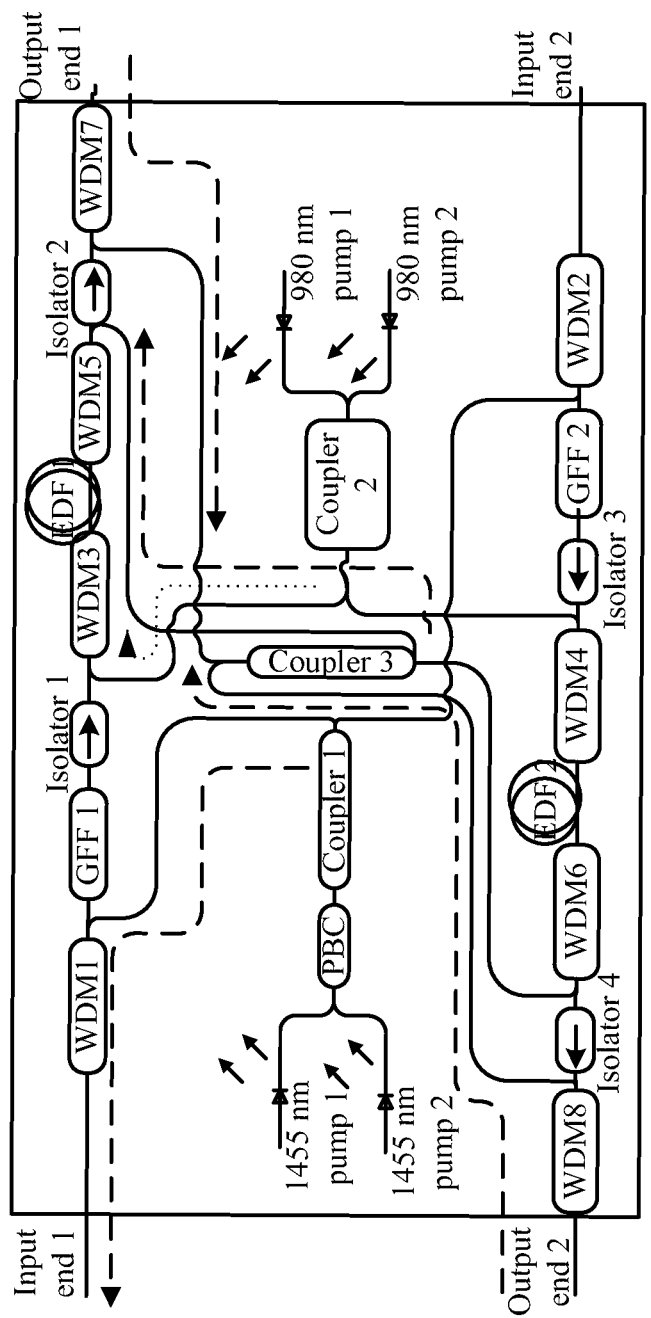
FIG. 11A is a schematic structural diagram of an optical repeater according to an embodiment of the present disclosure.

An embodiment of the present disclosure provides another optical repeater structure shown in FIG. 11A. The structure in this embodiment may be corresponding to a combination of FIG. 4 and FIG. 6D in the foregoing embodiment. The optical repeater includes: a WDM, a gain flatness filter (GFF), an Isolator, an EDF, a coupler, and a polarization beam combiner (PBC). In FIG. 11A, two input ends (input end 1 and input end 2) and two output ends (output end 1 and output end 2) are corresponding to a pair of optical paths with opposite directions respectively, and the two are symmetric. In this embodiment, one optical path is described, and the other optical path is not described any further.

In FIG. 11A, among WDM1 to WDM8, WDM1, WDM3, WDM5, and WDM7 belong to an upper optical path; between GFF1 and GFF2, GFF1 belongs to the upper optical path; between EDF1 and EDF2, EDF1 belongs to the upper optical path; among Isolator 1 to Isolator 4, Isolator 1 and Isolator 2 belong to the upper optical path; pump sources of 1455 nm pumps and 980 nm pumps are shared in the two optical paths; and coupler 1 to coupler 3 and the PBC are shared in the two optical paths. In the upper optical path, a connection relationship of the components is as follows:

An input end of WDM1 is connected to input end 1, output end 1 of WDM1 is connected to an input end of GFF1, an output end of GFF1 is connected to an input end of Isolator 1, an output end of Isolator 1 is connected to input end 1 of WDM3, an output end of WDM3 is connected to an input end of EDF1, an output end of EDF1 is connected to an input end of WDM5, output end 1 of WDM5 is connected to an input end of Isolator 2, an output end of Isolator 2 is connected to input end 1 of WDM7, and an output end of WDM7 is connected to output end 1;

1455 nm pump source 1 and 1455 nm pump source 2 are connected to input end 1 and input end 2 of the PBC respectively, an output end of the PBC is connected to input end 1 of coupler 1, output end 1 of coupler 1 is connected to output end 2 of WDM1, and output end 2 of coupler 1 is connected to output end 2 of WDM2; and 980 nm pump source 1 and 980 nm pump source 2 are connected to input end 1 and input end 2 of coupler 2 respectively, and output end 1 of coupler 2 is connected to input end 2 of WDM2, and output end 2 of coupler 2 is connected to input end 2 of WDM4.

The following describes light propagation directions in detail.

In the structure shown in FIG. 11A, two optical paths, namely one upper optical path and one lower optical path, are included, where a direction shown by the Isolator is a propagation direction of a signal light, which is not indicated independently by using an arrow in FIG. 11A. A direction of a dashed-line arrow is a propagation direction of a reverse pump light, and a direction of a dotted-line arrow is a propagation direction of a forward pump light. The reverse pump light is a pump light that is opposite to a propagation direction of a signal light, and the forward pump light is a pump light that is the same as a propagation direction of a signal light.

A propagation direction of a pump light is as follows:

1455 nm pump lights are separately generated by 1455 nm pump source 1 and 1455 nm pump source 2 and enter input end 1 and input end 2 of the PBC respectively; the PBC couples coupled pump lights that enters input end 1 and input end 2 of the PBC, and outputs a coupled pump light from the output end of the PBC to an input end of coupler 1; and coupler 1 divides the pump light of coupler 1 into two, where one is sent to output end 2 of WDM1, and the other one is sent to output end 2 of WDM2. The pump light that enters from output end 2 of WDM1 passes through WDM1 and is sent out from the input end of WDM1, and the pump light is sent into a previous optical repeater in the submarine cable optical fiber communications system along a direction of input end 1; and the pump light that enters from output end 2 of WDM2 passes through WDM 2 and is sent out from an input end of WDM 2, and the pump light is sent into a next optical repeater in the submarine cable optical fiber communications system along a direction of input end 2.

980 nm pump lights are separately generated by 980 nm pump source 1 and 980 nm pump source 2 and enter input end 1 and input end 2 of coupler 2 respectively; and coupler 2 couples the input pump lights and outputs coupled pump lights from output end 1 and output end 2 of coupler 2, where the pump light that is output from output end 1 of coupler 2 enters input end 2 of WDM3, and the pump light that is output from output end 2 of coupler 2 enters input end 2 of WDM4.

A propagation direction of a pump light is as follows: a signal light enters an optical repeater from input end 1, enters the input end of WDM1, passes through WDM1, enters the input end of GFF1 through output end 1 of WDM1, passes through GFF1, and enters the input end of Isolator 1 through the output end of GFF1; Isolator 1 allows the signal light that is input from the input end of Isolator 1 to pass, and outputs the signal light from the output end of Isolator 1 to input end 1 of WDM3; WDM3 outputs, from the output end of WDM3 to the input end of EDF1, the signal light that is input from input end 1 of WDM3 and the pump light that is input from input end 2 of WDM3; the pump light that enters EDF1 amplifies the signal light that enters EDF1, and an amplified signal light is output from the output end of EDF1 to the input end of WDM5; WDM5 outputs, from output end 1 of WDM5 to the input end of Isolator 2, the optical signal that is input from the input end of WDM5; Isolator 2 allows the signal light that is input from the input end of Isolator 2 to pass, and outputs the signal light from the output end of Isolator 2 to input end 1 of WDM7; and WDM7 outputs, from the output end of WDM7 to output end 1, the signal light that enters the input end 1 of WDM7.

In FIG. 11A, reverse pump lights that enter from output end 1 and output end 2 come from a next optical repeater and a previous repeater in the submarine cable optical fiber communications system respectively, and a propagation direction of the reverse pump light is as follows:

The reverse pump light that comes from the next optical repeater in the submarine cable optical fiber communications system enters the output end of WDM7 through output end 1; WDM7 sends out, from input end 2 of WDM7, the reverse pump light that enters from the output end of WDM7; and the reverse pump light that is sent out from input end 2 of WDM7 enters input end 1 of coupler 3;

the reverse pump light that comes from the previous optical repeater in the submarine cable optical fiber communications system enters an output end of WDM8 through output end 1; WDM8 sends out, from input end 2 of WDM8, the reverse pump light that enters from the output end of WDM8; and the reverse pump light that is sent out from input end 2 of WDM8 enters input end 1 of coupler 3;

coupler 3 couples the reverse pump lights that enter input end 1 of coupler 3 and enter input end 2 of coupler 3 and divides a coupled reverse pump light into two, where one is sent from output end 1 of coupler 3 to output end 2 of WDM5, and the other one is sent from output end 2 of coupler 3 to output end 2 of WDM6; and the pump light that enters from output end 2 of WDM5 passes through WDM5 and is sent out from the input end of WDM5, and the pump light that is sent out from the input end of WDM5 enters the output end of EDF1; and the reverse pump light that enters from the output end of EDF1 amplifies the signal light that passes through EDF1.

In the foregoing embodiment, a 1455 nm pump is used as a wavelength of a pump light, so that a signal light of 1550 nm wave band obtains a highest Raman gain, which helps to reduce a noise factor of an optical repeater; in addition, the wavelength is also in a stimulated absorption bandwidth range, and a residual pump light can exert a stimulation effect on an erbium ion.

In addition, in the structure shown in FIG. 11A, a 3 dB coupler may be used as a coupler, two 1455 nm Raman pumps are combined by the PBC, and lights are divided by the 3 dB coupler and coupled into an optical path of a signal light by a WDM component. Combining 1455 nm pumps by using the PBC enables the pump light to have a relatively low polarization degree, which helps to reduce a polarization-related gain. An optical isolator (Isolator 1) used on an input side of an EDFA is used to isolate reverse spontaneous radiation generated in an EDF. Further, a gain flatness filter (GFF) may also be used to balance gain spectrum.

In the foregoing embodiment, residual pump lights that are coupled by a WDM component (WDM7\WDM8) from transmission fibers of forward and reverse directions are combined by a 2×2 coupler (coupler 3) and then are coupled into an erbium doped fiber to implement redundancy of the residual pump lights. That is, when there are only forward or reverse residual pump lights, erbium doped fibers of two EDFAs may be stimulated by the residual pump lights.

In the foregoing embodiment, a service signal light is input from Input1 (input end 1), passes through WDM1, GFF1, optical isolator 1, and WDM3 in turn, enters erbium doped fiber 1, and is amplified; and then passes through WDM5, an optical isolator, and WDM7, is output from Output1 (output end 1), and enters a downstream transmission fiber; two 1455 nm pump lights are combined by the PBC and are divided into two by 3 dB coupler 1, where one part is coupled to an output end Input1 by WDM 1 and injected into a transmission fiber; two 980 pump lights are mixed by 3 dB coupler 2 and are divided into two, where one is coupled to an erbium doped fiber by WDM3 and is absorbed by erbium ions; and residual pump lights in a downstream optical fiber are input from an Output1 port, coupled by WDM7, and are divided into two by 3 dB coupler 3, where one is coupled into an erbium doped fiber by WDM5 and is absorbed by erbium ions.

In this embodiment, WDM1 and WDM2 may also be substituted by optical circulators; positions of GFF1 and GFF2 may be adjusted to positions behind isolator 2 and isolator 4; a direction of the 980 pump may be adjusted to be a reverse pump; a residual Raman pump may be adjusted to be a forward pump; to obtain a larger gain bandwidth and a greater span length, a pair of Raman pump lasers may also be added, for example, 3 dB coupler 1 is replaced with a 2×2 3 dB coupler, and the other input end may be connected to a pair of 1425 nm Raman pumps, so that amplification bandwidths can cover 1530 to 1565 nm.

To describe beneficial effects of the solutions in this embodiment of the present disclosure more specifically, a 12 dB gain optical repeater is designed according to the foregoing embodiment, and is compared with the EDFA solution and a Raman/EDFA hybrid amplification solution without coupling of residual pump lights, which is specifically shown in Table 1 below.

Raman/EDFA hybrid amplification (with coupling of residual pumps): all pumps inside the repeater fail;
Raman/EDFA hybrid amplification (without coupling of residual pumps): all pumps inside the repeater fail; and
EDFA amplification: all pumps fail.

Figure 11B:
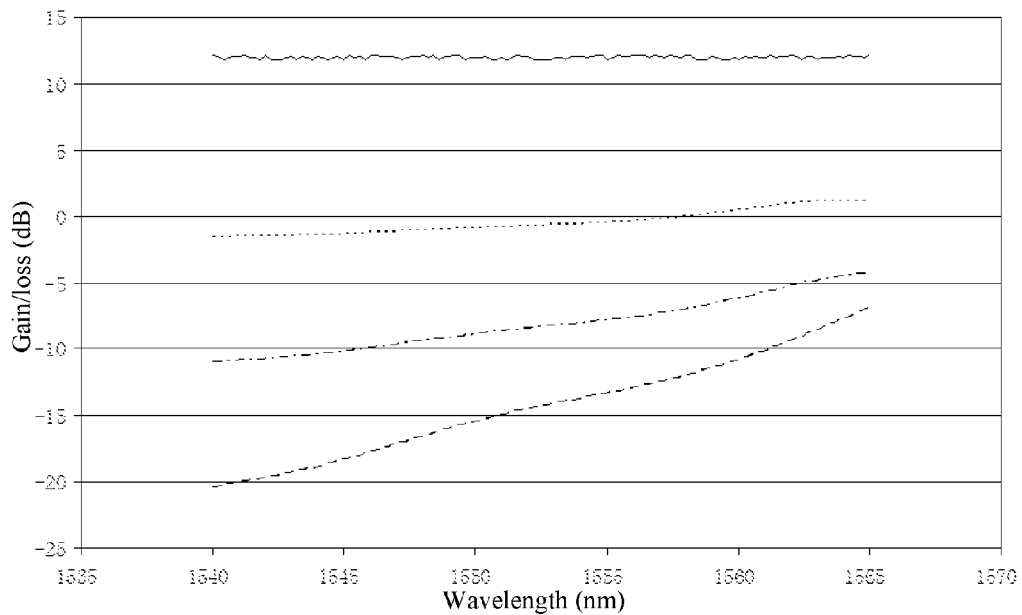
FIG. 11B is a schematic diagram of comparison of gain and noise factor spectral lines according to an embodiment of the present disclosure.
Figure 11C:
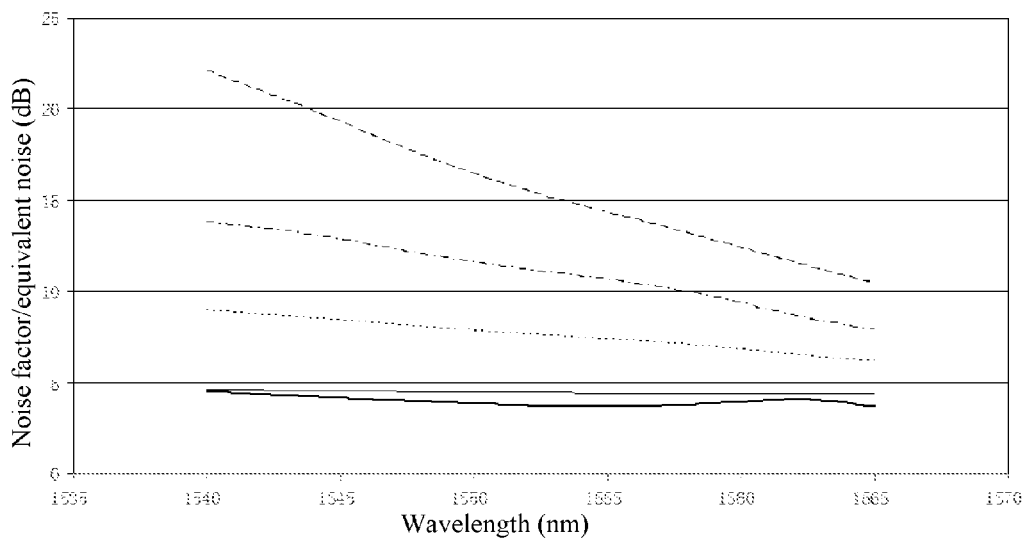
FIG. 11C is a schematic diagram of comparison of gain and noise factor spectral lines according to an embodiment of the present disclosure.

In FIG. 11C, a 1550 nm wavelength is used as a reference, and curves in FIG. 11C from top to bottom are as follows:
EDFA amplification: all pumps inside the repeater fail;
Raman/EDFA hybrid amplification (without coupling of residual pumps): all pumps inside the repeater fail;
Raman/EDFA hybrid amplification (with coupling of residual pumps): all pumps inside the repeater fail;
EDFA amplification: all pumps inside the repeater are normal; and
Raman/EDFA hybrid amplification (with/without coupling of residual pumps) (whether there is coupling of residual pumps has a small effect on an NF and the difference can be ignored): all pumps inside the repeater are normal.

As may be seen from the foregoing, compared with the EDFA solution, in the solution in this embodiment of the present disclosure, the noise factor is improved by around 0.5 dB; and compared with the EDFA amplification solution and the Raman/EDFA hybrid amplification solution, a signal loss is effectively reduced in a scenario in which all pumps fail, a small gain may also be provided in a long-wavelength area, and a noise factor when the pumps fail is significantly reduced. All these help to improve a pump failure tolerance capability of the optical repeater.

An embodiment of a submarine cable transmission system is further provided based on this embodiment of the present disclosure. FIG. 1A and FIG. 1B are system network diagrams, where an optical repeater uses the optical repeater solution in this embodiment, and a pure silica core fiber link without dispersion compensation and with a large effective area is used. Main configuration parameters in the system are shown in Table 2 below.

TABLE 1

|  | EDFA | Raman/EDFA hybrid amplification | Raman/EDFA hybrid amplification (this embodiment of the present disclosure) |
|---|---|---|---|
| 980 nm EDFA pump power (injected into an erbium doped fiber) | 120 mW | 120 mW | 112 mW |
| 1455 nm Raman pump power (injected into a transmission fiber) | NA | 250 mW | 250 mW |
| Upstream and downstream residual Raman pump power (injected into an erbium doped fiber) | NA | NA | 7 mW |
| Erbium doped fiber length | 10 m | 5.7 m | 5.7 m |
| Average (equivalent) gain | 12 dB | 12 dB | 12 dB |
| Average (equivalent) noise factor | 4.46 dB | 3.97 dB | 3.97 dB |
| Saturation output power | 14.8 dBm | 14.8 dBm | 14.8 dBm |
| Repeater gain when all pumps in a device do not work/fail | −14.35 dB (average) | −8.16 dB (average) | −0.48 dB (average) |
|  | −20.45 dB (minimum) | −11.02 dB (minimum) | −1.58 dB (minimum) |
|  | −6.87 dB (maximum) | −4.28 dB (maximum) | 1.19 dB (maximum) |

Gain and noise factor spectrum lines under different conditions for the EDFA solution, the Raman/EDFA hybrid amplification solution, and the solution in this embodiment of the present disclosure are shown in FIG. 11B and FIG. 11C.

In FIG. 11B, a 1540 nm wavelength is used as a reference, and curves in FIG. 11B from top to bottom are as follows:

Raman/EDFA hybrid amplification or EDFA amplification (with/without coupling of residual pumps): all pumps inside the repeater are normal;

TABLE 2

| Parameter | Unit | Parameter |
|---|---|---|
| Quantity of signal lights |  | 60 |
| Signal light wavelength range | nm | 1540-1565 |
| Signal light wavelength spacing | GHz | 50 |
| Span length | km | 72 (corresponding to a 12 dB span loss) |

TABLE 2-continued

| Parameter | Unit | Parameter |
|---|---|---|
| Quantity of spans | | 100 |
| Link optical fiber | | Pure silica core fiber (Pure Silica Core Fiber, PSCF) link without dispersion compensation |
| Repeater type | | Raman/EDFA hybrid amplification optical repeater, where upstream and downstream residual Raman pump lights are coupled into an EDFA erbium doped fiber |
| Saturation output power of a repeater | dBm | 14.8 |
| Typical noise factor of a repeater | dB | 4 |
| Loss factor of a transmission fiber | dB/km | Typical value 0.165 |
| Fiber dispersion factor of a transmission fiber | ps/nm*km | Typical value 20.5 |
| Dispersion slope rate of a transmission fiber | ps/nm$^2$*km | Typical value +0.06 |
| Effective area of a transmission fiber | um$^2$ | Typical value 112 |
| OTU type | | 100 Gbit/s PDM-QPSK (Polarization-division multiplexing Quadrature Phase Shift Keying, Polarization-division multiplexing Quadrature Phase Shift Keying), coherent receiving |
| OTU dispersion tolerance | ps/nm | >150000 |
| OSNR tolerance available after a signal light is transmitted | dB | 14.2 dB |

Figure 11D:
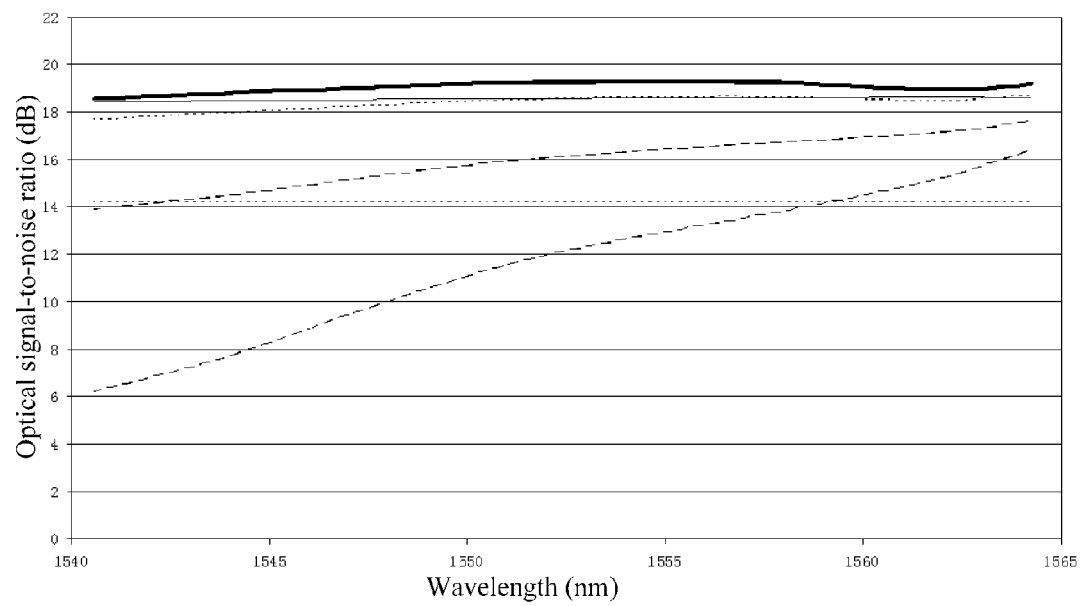
FIG. 11D is a schematic diagram of an impact on an OSNR when all pumps in an optical repeater fail according to an embodiment of the present disclosure.

Through simulation calculation estimation, when all optical repeaters in the system are in normal states, a system OSNR is between 18.5 and 19.3 dB OSNR (shown in FIG. 11D, which is a schematic diagram of an impact on the OSNR when all pumps in one optical repeater in the system fail).

In FIG. 11D, a 1545 nm wavelength is used as a reference, and curves in FIG. 11D from top to bottom are as follows:

Raman/EDFA hybrid amplification link (all pumps in repeaters are normal);

EDFA amplification link (all pumps in repeaters are normal);

Raman/EDFA hybrid amplification link (all pumps in an optical repeater fail, with coupling of upstream and downstream residual pumps);

Raman/EDFA hybrid amplification link (all pumps in an optical repeater fail, without coupling of upstream and downstream residual pumps);

receiving OSNR tolerance available after a signal light is transmitted in the system; and EDFA amplification link (all pumps in an optical repeater fail).

As may be seen from the diagram shown in FIG. 11D, when the optical repeater of the present disclosure is used in the system, and all pumps in an optical repeater do not work, a system OSNR is degraded by 0.8 to 0.4 dB, and degradation of a short wavelength is a little greater, but all wavelength OSNRs still remain above 17.6 dB, there is still an OSNR margin of 3.4 Db, compared with an OSNR tolerance of 14.2 dB available after a signal is transmitted, and all service signal lights can be normally transmitted.

If the optical repeater does not couple the upstream and downstream residual Raman pump lights into an erbium doped fiber, OSNRs of partial service signal lights near 1540 nm are degraded and lower than the OSNR tolerance available after a signal light is transmitted, which causes service interruption or performance instability. If the system uses a traditional pure EDFA amplification optical repeater instead of a Raman/EDFA hybrid amplification optical repeater, when all pumps in an optical repeater fail, OSNRs of most service signals are lower than the OSNR tolerance available after a service signal is transmitted in the system, and services are interrupted.

It can be seen that, in this embodiment of the present disclosure, coupling upstream and downstream residual Raman pump lights into an EDFA significantly improves an optical repeater failure tolerance capability of a system. In the scenario of this embodiment, even when all pumps in an optical repeater fail, it can still be ensured that no service is interrupted, which is a substantial improvement compared with the traditional EDFA amplification and Raman/EDFA hybrid amplification optical repeaters.

3.

Figure 12:
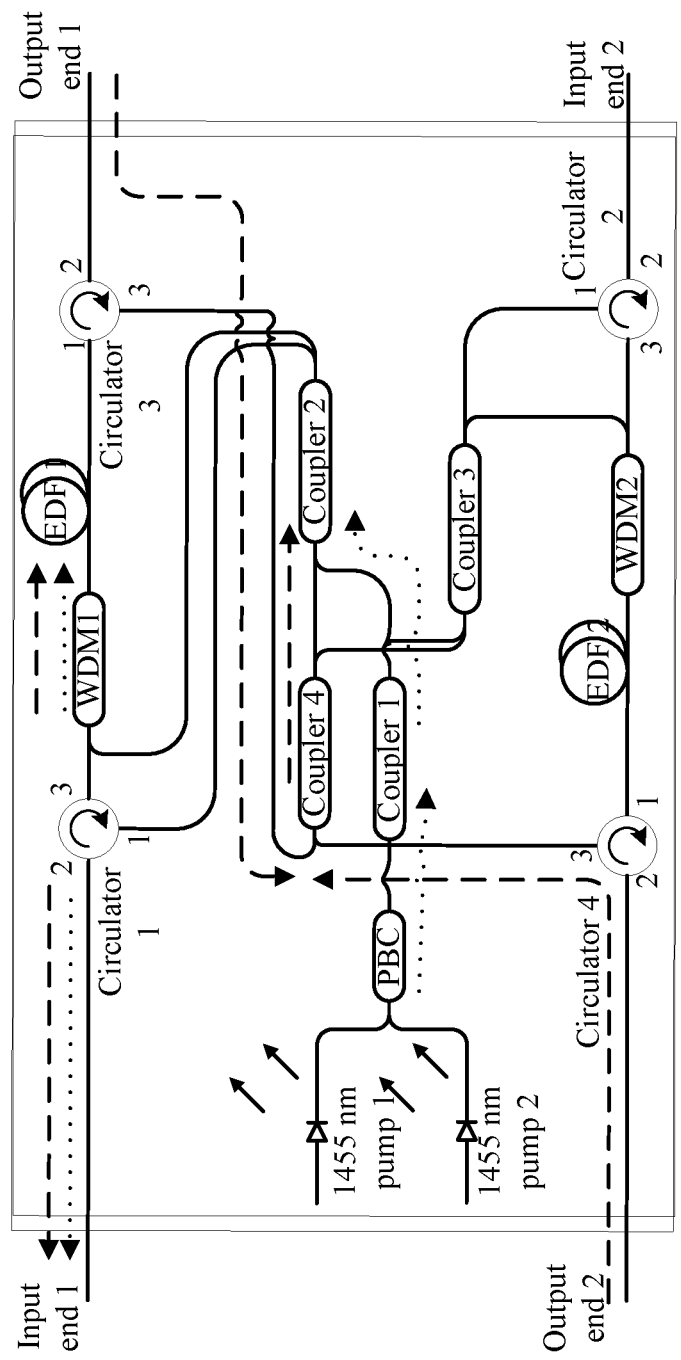
FIG. 12 is a schematic structural diagram of an optical repeater according to an embodiment of the present disclosure.

An embodiment of the present disclosure provides another optical repeater structure shown in FIG. 12. The structure in this embodiment may be corresponding to a combination of FIG. 7 and FIG. 8 in the foregoing embodiment. The optical repeater includes: a circulator, a WDM, an EDF, a coupler, and a PBC. In FIG. 12, two input ends (input end 1 and input end 2) and two output ends (output end 1 and output end 2) are corresponding to a pair of optical paths with opposite directions respectively, and the two are symmetric. In this embodiment, one optical path is described, and the other optical path is not described any further.

In FIG. 12, among circulator 1 to circulator 4, circulator 1 and circulator 3 belong to an upper optical path; between WDM 1 and WDM2, WDM1 belongs to the upper optical path; between EDF1 and EDF2, EDF1 belongs to the upper optical path; a 1455 nm pump is shared in the two optical paths; and coupler 1 to coupler 4 and the PBC are shared in the two optical paths. In the upper optical path, a connection relationship of the components is as follows:

Input end 1 is connected to interface 2 of circulator 1, interface 3 of a circulator is connected to input end 1 of WDM1, an output end of WDM1 is connected to an input end of EDF1, an output end of EDF1 is connected to interface 1 of circulator 3, and interface 2 of circulator 3 is connected to output end 1;

1455 nm pump source 1 and 1455 nm pump source 2 are connected to input end 1 and input end 2 of the PBC respectively, an output end of the PBC is connected to input end 1 of coupler 1, output end 1 of coupler 1 is connected to input end 1 of coupler 2, output end 2 of coupler 1 is connected to input end 1 of coupler 3; output end 1 of coupler 2 is connected to port 1 of circulator 1, and output end 2 of coupler 2 is connected to input end 2 of WDM1; and port 3 of circulator 3 is connected to input end 1 of coupler 4, port 3 of circulator 1 is connected to input end 2 of coupler 4, output end 1 of coupler 4 is connected to input end 2 of coupler 2, and output end 2 of coupler 4 is connected to input end 2 of coupler 3.

The following describes light propagation directions in detail.

In the structure shown in FIG. 12, two optical paths, namely one upper optical path and one lower optical path, are included, where a propagation direction of a signal light in the upper optical path is from left to right (the signal light enters input end 1 and is sent out from output end 1), which is not indicated independently by using an arrow in FIG. 11A. A direction of a dashed-line arrow is a propagation direction of a reverse pump light, and a direction of a dotted-line arrow is a propagation direction of a forward pump light. The reverse pump light is a pump light that is opposite to a propagation direction of a signal light, and the forward pump light is a pump light that is the same as a propagation direction of a signal light.

A propagation direction of a pump light is as follows:

1455 nm pump lights are separately generated by 1455 nm pump source 1 and 1455 nm pump source 2 and enter input end 1 and input end 2 of the PBC respectively; the PBC couples coupled pump lights that enters input end 1 and input end 2 of the PBC, and outputs a coupled pump light from the output end of the PBC to an input end of coupler 1; and coupler 1 divides the pump light of coupler 1 into two, where one is sent to input end 1 of a coupler, and the other one is sent to input end 1 of coupler 3;

a reverse pump light that enters from port 2 of circulator 3 is sent out from port 3 of circulator 3 and enters input end 1 of coupler 4; a reverse pump light that enters from port 2 of circulator 4 is sent out from port 3 of circulator 4 and enters input end 2 of coupler 4; coupler 4 couples the reverse pump lights that enter input end 1 of coupler 4 and input end 2 of coupler 4 and divides coupled pump lights into two, where one is sent to input end 2 of coupler 2, and the other one is sent to input end 2 of coupler 3; and coupler 2 couples the pump light that enters input end 1 of coupler 2 and the reverse pump light that enters input end 2 of coupler 2 and divides coupled pump lights into two, where one is sent to port 1 of circulator 1 from output end 1 of coupler 2 and the pump light that enters port 1 of circulator 1 is sent to input end 1 from port 3 of circulator 1, and the other is sent to input end 2 of WDM 1 from output end 2 of coupler 2.

A propagation direction of a pump light is as follows: a signal light enters an optical repeater from input end 1, enters port 2 of circulator 1, and is sent out from port 3 of circulator 1; the signal light that is sent out from port 3 of circulator 1 enters input end 1 of WDM1; WDM1 sends the signal light that enters input end 1 of WDM1 and the pump light that enters input end 2 of WDM1 to the input end of EDF1; and the pump light that enters EDF1 amplifies the signal light that enters EDF1, and an amplified signal light is output from the output end of EDF1 to port 1 of circulator 3, and the signal light that enters port 1 of circulator 3 is transmitted to output end 1 from port 2 of circulator 3.

In the foregoing embodiment, a group of 1455 nm pump lights are combined by the PBC and are equally divided into two subgroups by coupler 1. Each subgroup is divided into two by a coupler, and then is coupled separately, by the circulator and the WDM, into a transmission fiber and an erbium doped fiber as a Raman pump light and an EDFA pump light respectively. Two residual Raman pump lights that are transmitted from a downstream optical repeater are coupled and output by another circulator, mixed by a 2*2 coupler, input from the other input ends of couplers 2 and 3, divided into two, and then injected into the erbium doped fiber and the transmission fiber respectively. In this embodiment, coupler 1 and coupler 4 are proportional couplers, that is, 50/50 couplers, and coupler 2 and coupler 3 are non-proportional couplers, for example, 30/70 couplers.

A flow direction of an optical signal is as follows: a service signal light is input from Input1, passes through circulator 1 and WDM1 in turn, enters erbium doped fiber 1 and is amplified; and then passes through circulator 3, is output from Output1, and enters a downstream transmission fiber. Two 1455 nm pump lights are combined by the PBC and are divided into two by coupler 1. One part is further divided into two by coupler 2, where one with a larger proportion is coupled and injected into an upstream transmission fiber by circulator 1, and the other one with a smaller proportion is coupled and injected into erbium doped fiber 1 by WDM1. The other part of the pump lights divided by coupler 1 is finally coupled, in a same manner, into an upstream transmission fiber and erbium doped fiber 2 in the other optical fiber link. A residual pump light in a downstream optical fiber is input from a port Output1, coupled and divided by circulator 3, and then is equally divided into two by coupler 4. One is further divided into two by coupler 2, where one with a smaller proportion is coupled and injected into an upstream transmission fiber by circulator 1, and the other one with a larger proportion is coupled and injected into erbium doped fiber 1 by WDM1. The other one is finally coupled, in a same manner, into an upstream transmission fiber and erbium doped fiber 2 in the other optical fiber link.

4.

Figure 13:
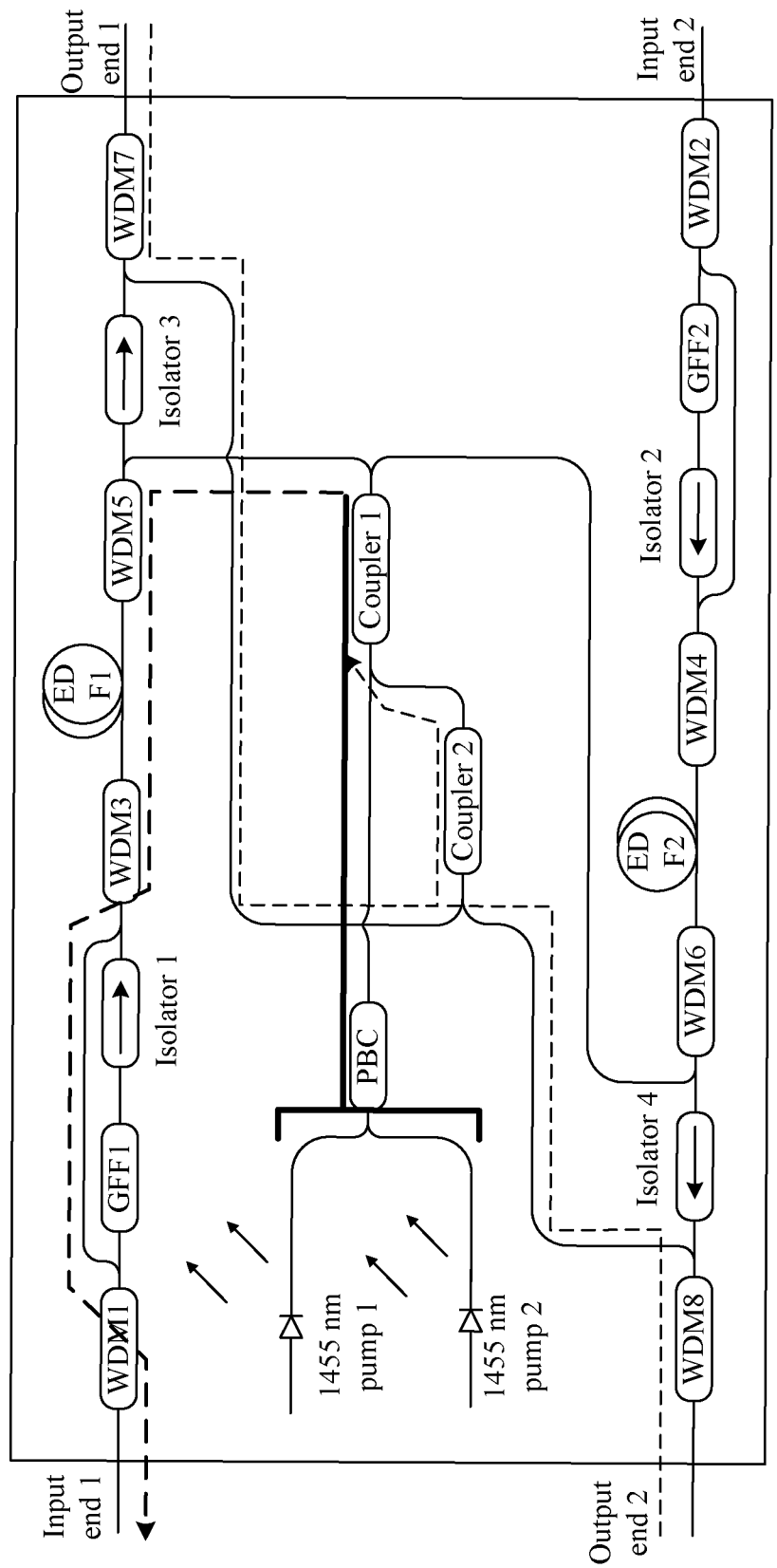
FIG. 13 is a schematic structural diagram of an optical repeater according to an embodiment of the present disclosure.

An embodiment of the present disclosure provides another optical repeater structure shown in FIG. 13. The structure in this embodiment may be corresponding to a combination of FIG. 5 and FIG. 6A in the foregoing embodiment. The optical repeater includes: a WDM, a GFF, an Isolator, an EDF, a coupler, and a PBC. In FIG. 13, two input ends (input end 1 and input end 2) and two output ends (output end 1 and output end 2) are corresponding to a pair of optical paths with opposite directions respectively, and the two are symmetric. In this embodiment, one optical path is described, and the other optical path is not described any further.

In FIG. 13, among WDM1 to WDM8, WDM1, WDM3, WDM5, and WDM7 belong to an upper optical path; between GFF1 and GFF2, GFF1 belongs to the upper optical path; between EDF1 and EDF2, EDF1 belongs to the upper optical path; among Isolator 1 to Isolator 4, Isolator 1 and Isolator 3 belong to the upper optical path; pump sources of 1455 nm pumps are shared in the two optical paths; and coupler 1, coupler 2, and the PBC are shared in the two optical paths. In the upper optical path, a connection relationship of the components is as follows:

An input end of WDM1 is connected to input end 1, output end 1 of WDM1 is connected to an input end of GFF1, and output end 2 of WDM 1 is connected to input end 2 of WDM3; an output end of GFF1 is connected to an input end of Isolator 1, an output end of Isolator 1 is connected to input end 1 of WDM3, an output end of WDM3 is connected to an input end of EDF1, the output end of EDF1 is connected to an input end of WDM5, output end 1 of WDM5 is connected to an input end of Isolator 3, output end 2 of WDM5 is connected to output end 1 of coupler 1, an output end of Isolator 3 is connected to input end 1 of WDM7, and an output end of WDM7 is connected to output end 1;

1455 nm pump source 1 and 1455 nm pump source 2 are connected to input end 1 and input end 2 of the PBC respectively, an output end of the PBC is connected to input end 1 of coupler 1, output end 1 of coupler 1 is connected to output end 2 of WDM5, and output end 2 of coupler 1 is connected to output end 2 of WDM6; and Input end 2 of WDM7 is connected to input end 1 of coupler 2, input end 2 of WDM8 is connected to input end 2 of coupler 2, and an output end of coupler 2 is connected to input end 2 of coupler 1.

The following describes light propagation directions in detail.

In the structure shown in FIG. 11A, two optical paths, namely one upper optical path and one lower optical path, are included, where a direction shown by the Isolator is a propagation direction of a signal light, which is not indicated independently by using an arrow in FIG. 13. A direction of a dashed-line arrow is a propagation direction of a reverse pump light, and a direction of a solid-line arrow is a propagation direction of a pump light generated inside the optical repeater. The reverse pump light is a pump light that is opposite to a propagation direction of a signal light, and the forward pump light is a pump light that is the same as a propagation direction of a signal light.

In FIG. 13, reverse pump lights that enter from output end 1 and output end 2 come from a next optical repeater and a previous repeater in the submarine cable optical fiber communications system respectively, and a propagation direction of the reverse pump light is as follows:

A reverse pump light is sent into the optical repeater through output end 1 and enters the output end of WDM7; WDM7 couples the reverse pump light and sends it out from input end 2 of WDM7 to input end 1 of coupler 2; the reverse pump light is sent into the optical repeater from output end 2 and enters an output end of WDM8; WDM8 couples the reverse pump light and sends it out from input end 2 of WDM8 to input end 2 of coupler 2; coupler 2 couples the reverse pump light that enters input end 1 of coupler 2 and the reverse pump light that enters input end 2 of coupler 2; and coupler 2 sends a coupled reverse pump light from the output end of coupler 2 to input end 2 of coupler 1.

A propagation direction of a pump light is as follows:

1455 nm pump lights are separately generated by 1455 nm pump source 1 and 1455 nm pump source 2 and enter input end 1 and input end 2 of the PBC respectively; and the PBC couples the pump lights that enter input end 1 and input end 2 of the PBC and outputs a coupled pump light from the output end of PBC to an input end of coupler 1;

coupler 1 couples the pump light that enters input end 1 of coupler 1 and the reverse pump light that enters input end 2 of coupler 1, and divides a coupled pump light into two, where one is sent from output end 1 of coupler 1 to output end 2 of WDM5, and the other one is sent to output end 2 of WDM6; and a pump light that enters output end 2 of WDM5 is coupled by WDM5 and is sent to an output end of EDF1 through the input end of WDM5; the pump light that enters EDF1 amplifies a signal light that passes through EDF1; a residual pump light is sent to the output end of WDM3 through the input end of EDF1; WDM3 couples the residual pump light that enters the output end of WDM3 and sends a coupled residual pump light to output end 2 of WDM1 through input end 2 of WDM3; WDM1 couples the residual pump light that enters output end 2 of WDM1 and sends a coupled residual pump light from the input end of WDM1 to input end 1, where the pump light is sent into a previous optical repeater in the submarine cable optical fiber communications system along a direction of input end 1.

A propagation direction of a pump light is as follows: a signal light enters an optical repeater from input end 1, enters the input end of WDM1, passes through WDM1, enters the input end of GFF1 through output end 1 of WDM1, passes through GFF1, and enters the input end of Isolator 1 through the output end of GFF1; Isolator 1 allows the signal light that is input from the input end of Isolator 1 to pass, and outputs the signal light from the output end of Isolator 1 to input end 1 of WDM3; WDM3 outputs, from the output end of WDM3 to the input end of EDF1, the signal light that is input from input end 1 of WDM3; the pump light that enters EDF1 amplifies the signal light that enters EDF1, and an amplified signal light is output from the output end of EDF1 to the input end of WDM5; WDM5 outputs, from output end 1 of WDM5 to the input end of Isolator 3, the optical signal that is input from the input end of WDM5; Isolator 3 allows the signal light that is input from the input end of Isolator 3 to pass, and outputs the signal light from the output end of Isolator 3 to input end 1 of WDM7; and WDM7 outputs, from the output end of WDM7 to output end 1, the signal light that enters the input end 1 of WDM7.

It should be noted that, the apparatus division is merely logical function division, but the present disclosure is not limited to the foregoing division, as long as corresponding functions can be implemented. In addition, specific names of the functional units are merely provided for the purpose of distinguishing the units from one another, but are not intended to limit the protection scope of the present disclosure.

In addition, a person of ordinary skill in the art may understand that all or a part of the steps of the method embodiments may be implemented by a program instructing relevant hardware. The program may be stored in a computer readable storage medium. The storage medium may include: a read-only memory, a magnetic disk, or an optical disc.

The foregoing descriptions are merely exemplary implementation manners of the present disclosure, but are not intended to limit the protection scope of the present disclosure. Any variation or replacement readily figured out by a person skilled in the art within the technical scope disclosed in the embodiments of the present disclosure shall fall within the protection scope of the present disclosure. Therefore, the protection scope of the present disclosure shall be subject to the protection scope of the claims.

What is claimed is:

1. An optical repeater, comprising:
   a first input end of the optical repeater;
   a first output end of the optical repeater;
   a first erbium doped fiber;
   a first coupler;
   a second coupler; and
   a first pump light processing component,
   wherein:
      the first input end of the optical repeater is connected to an input end of the first erbium doped fiber, an output end of the first erbium doped fiber is connected to an input end of the first coupler, a first output end of the first coupler is connected to a first input end of the second coupler, and an output end of the second coupler is connected to the first output end of the optical repeater;
      an input end of the first pump light processing component is connected to a second input end of the second coupler, and an output end of the first pump light processing component is connected to a second output end of the first coupler;
      reverse pump lights enter the optical repeater through the first output end and enter the second coupler through the output end of the second coupler, and the second coupler couples the reverse pump lights that enter the second coupler and sends a coupled reverse pump light to the input end of the first pump light processing component through the second input end of the second coupler;
      a signal light enters the optical repeater through the first input end of the optical repeater, passes through the first erbium doped fiber, the first coupler, and the second coupler in turn, and is sent out of the optical repeater through the first output end of the optical repeater;

the output end of the first pump light processing component sends a pump light to the second output end of the first coupler, wherein the pump light comprises a local-end pump light generated by one or more of the first pump light processing component and the reverse pump lights; and the first coupler sends the pump light received by the second output end of the first coupler to the output end of the first erbium doped fiber through the input end of the first coupler, and the pump light enters the first erbium doped fiber through the output end of the first erbium doped fiber.

2. The optical repeater according to claim 1, further comprising:

a third coupler, wherein the output end of the first pump light processing component comprises a first output end of the first pump light processing component and a second output end of the first pump light processing component, wherein:

an input end of the third coupler is connected to the first input end of the optical repeater, and a first output end of the third coupler is connected to the input end of the first erbium doped fiber;

a second output end of the third coupler is connected to the second output end of the first pump light processing component, and the second output end of the first coupler is connected to the first output end of the first pump light processing component;

the second output end of the first pump light processing component sends a pump light to the second output end of the third coupler, and the third coupler sends the pump light received by the second output end of the third coupler to the first input end of the optical repeater through the input end of the third coupler; and the first output end of the first pump light processing component sends a pump light to the second output end of the first coupler, and the first coupler sends the pump light received by the second output end of the first coupler to the output end of the first erbium doped fiber through the input end of the first coupler.

3. The optical repeater according to claim 2, further comprising:

a sixth coupler, wherein the output end of the first pump light processing component further comprises a third output end of the first pump light processing component, wherein:

the sixth coupler is located in an optical path of a signal light between the third coupler and the first erbium doped fiber, the first output end of the third coupler is connected to a first input end of the sixth coupler, the third output end of the first pump light processing component is connected to a second input end of the sixth coupler, and an output end of the sixth coupler is connected to the input end of the first erbium doped fiber; and the third output end of the first pump light processing component sends a pump light to the second input end of the sixth coupler, and the sixth coupler sends the pump light received by the second input end of the sixth coupler to the input end of the first erbium doped fiber through the output end of the sixth coupler.

4. The optical repeater according to claim 1, further comprising:

a fourth coupler, an optical isolator, and a fifth coupler, wherein:

the fourth coupler, the optical isolator, and the fifth coupler are connected in turn in an optical path of a signal light between the optical repeater and the first erbium doped fiber; and an input end of the fifth coupler is connected to the first input end of the optical repeater, a first output end of the fifth coupler is connected to an input end of the optical isolator, an output end of the optical isolator is connected to a first input end of the fourth coupler, and a second output end of the fifth coupler is connected to a second input end of the fourth coupler; and after the pump light that enters the first erbium doped fiber amplifies the signal light that passes through the first erbium doped fiber, a residual pump light that is of a pump and enters the first erbium doped fiber is sent to an output end of the fourth coupler through the output end of the first erbium doped fiber, the fourth coupler sends the residual pump light received by the output end of the fourth coupler to the second output end of the fifth coupler through the second input end of the fourth coupler, and the fifth coupler sends the residual pump light received by the output end of the fifth coupler to the first input end of the optical repeater through the input end of the fifth coupler.

5. The optical repeater according to claim 1, wherein the input end of the first pump light processing component comprises a first input end of the first pump light processing component and a second input end of the first pump light processing component; and the first input end of the first pump light processing component is a port that is of the first pump light processing component and that is connected to the second input end of the second coupler; and the second input end of the first pump light processing component receives a reverse pump light that comes from an optical path of a signal light on a side opposite to the signal light.

6. The optical repeater according to claim 1, wherein:

when the input end of the first pump light processing component comprises a first input end of the first pump light processing component and a second input end of the first pump light processing component, the first input end of the first pump light processing component is a port that is of the first pump light processing component and that is connected to the second input end of the second coupler, and the second input end of the first pump light processing component receives a reverse pump light that comes from an optical path of a signal light on a side opposite to the signal light;

the first pump light processing component comprises a first pump source, a first polarization beam combiner, a tenth coupler, and an eleventh coupler;

an output end of the first pump source is connected to an input end of the first polarization beam combiner, an output end of the first polarization beam combiner is connected to a first input end of the tenth coupler, and a first output end of the tenth coupler is used as the output end of the first pump light processing component;

a first input end of the eleventh coupler is used as the first input end of the first pump light processing component, a second input end of the eleventh coupler is used as the second input end of the first pump light processing component, and a first output end of the eleventh coupler is connected to a second input end of the tenth coupler; and the first pump source generates a local-end pump light and sends the local-end pump light to the input end of the first polarization beam combiner, and the first polarization beam combiner sends the local-end pump light that enters the input end of the first polarization beam combiner to the first input end of the tenth coupler through the output end of the first polarization beam combiner; the eleventh coupler couples a reverse pump light that enters from the first input end of the eleventh coupler and a reverse pump light that enters from the second input end of the eleventh coupler, and sends, from the first output end of the eleventh coupler to the second input end of the tenth coupler, a part of a reverse pump light obtained through coupling, and the tenth coupler couples the local-end pump light that enters from the first input end of the tenth coupler and the reverse pump light that enters from the second input end of the tenth coupler, and outputs, from the first output end of the tenth coupler, a part of pump light obtained through coupling.

7. The optical repeater according to claim 3,
wherein the first pump light processing component comprises: a second pump source, a third pump source, a twelfth coupler, and a thirteenth coupler, wherein:
an output end of the second pump source is connected to an input end of the twelfth coupler, and a first output end of the twelfth coupler is used as the second output end of the first pump light processing component, an output end of the third pump source is connected to an input end of the thirteenth coupler, and a first output end of the thirteenth coupler is used as the third output end of the first pump light processing component;
the second pump source generates first local-end pump lights and sends the first local-end pump lights to the input end of the twelfth coupler through the output end of the second pump source, and the twelfth coupler couples the first local-end pump lights that enter the input end of the twelfth coupler, and outputs, from the first output end of the twelfth coupler, a part of a first local-end pump light obtained through coupling;
the third pump source generates second local-end pump lights and sends the second local-end pump lights to the input end of the thirteenth coupler through the output end of the third pump source, and the thirteenth coupler couples the second local-end pump lights that enter the input end of the thirteenth coupler, and outputs, from the first output end of the thirteenth coupler, a part of a second local-end pump light obtained through coupling;
the reverse pump light from the second output end of the second coupler enters from the input end of the first pump light processing component and is directly output to the second output end of the first coupler from the first output end of the first pump light processing component; and when the input end of the first pump light processing component comprises a first input end of the first pump light processing component and a second input end of the first pump light processing component, the first input end of the first pump light processing component is a port that is of the first pump light processing component and that is connected to the second input end of the second coupler, the second input end of the first pump light processing component receives a reverse pump light that comes from an optical path of a signal light on a side opposite to the signal light, and the reverse pump light that comes from the optical path of a signal light on a side opposite to the signal light is directly output to the second output end of the first coupler from the first output end of the first pump light processing component.

8. The optical repeater according to claim 7, wherein:
when the input end of the first pump light processing component comprises the first input end of the first pump light processing component and the second input end of the first pump light processing component, the first pump light processing component further comprises a fourteenth coupler;
a first input end of the fourteenth coupler is used as the first input end of the first pump light processing component, a second input end of the fourteenth coupler is used as the second input end of the first pump light processing component, and a first output end of the fourteenth coupler is used as the first output end of the first pump light processing component; and
the fourteenth coupler couples the reverse pump light that comes from the second coupler and enters the first input end of the fourteenth coupler and the reverse pump light that comes from the optical path of a signal light on a side opposite to the signal light and enters the second input end of the fourteenth coupler, and sends a part of a reverse pump light obtained through coupling to the second output end of the first coupler through the first output end of the fourteenth coupler.

9. The optical repeater according to claim 1,
wherein the second coupler is a first circulator, wherein the first circulator is a circulator in which a first port, a second port, and a third port are connected in sequence; and
wherein the first port of the first circulator is the first input end of the second coupler, the second port of the first circulator is the output end of the second coupler, and the third port of the first circulator is the second input end of the second coupler.

10. The optical repeater according to claim 2,
wherein the third coupler is a second circulator, wherein the second circulator is a circulator in which a first port, a second port, and a third port are connected in sequence; and
wherein the first port of the second circulator is the second output end of the third coupler, the second port of the second circulator is the input end of the third coupler, and the third port of the second circulator is the first output end of the third coupler.

11. The optical repeater according to claim 1, wherein a gain flatness filter is further concatenated in an optical path of the signal light.

12. An optical repeater, comprising:
a first input end of the optical repeater;

a first output end of the optical repeater;
a second erbium doped fiber;
a seventh coupler;
an eighth coupler;
a ninth coupler; and
a second pump light processing component,
wherein:
  the first input end of the optical repeater is connected to an input end of the ninth coupler, a first output end of the ninth coupler is connected to a first input end of the seventh coupler, an output end of the seventh coupler is connected to the second erbium doped fiber, an output end of the second erbium doped fiber is connected to a first input end of the eighth coupler, and an output end of the eighth coupler is connected to the output end of the optical repeater;
  an input end of the second pump light processing component is connected to a second input end of the eighth coupler, a first output end of the second pump light processing component is connected to a second output end of the ninth coupler, and a second output end of the second pump light processing component is connected to a second input end of the seventh coupler;
  reverse pump lights enter the optical repeater through the first output end and enter the eighth coupler through the output end of the eighth coupler, and the eighth coupler couples the reverse pump lights that enter the eighth coupler and sends a coupled reverse pump light to the input end of the second pump light processing component through the second input end of the eighth coupler;
  a signal light enters the optical repeater through the first input end of the optical repeater, passes through the ninth coupler, the seventh coupler, the second erbium doped fiber, and the eighth coupler in turn, and is sent out of the optical repeater through the first output end of the optical repeater;
  the first output end of the second pump light processing component sends a pump light to the second output end of the ninth coupler; the second output end of the second pump light processing component sends a pump light to the second input end of the seventh coupler, wherein the pump light comprises one or more of a local-end pump light generated by the first pump light processing component and the reverse pump lights; and
  the pump light that enters the second output end of the ninth coupler is sent out of the optical repeater from the first input end of the optical repeater through the input end of the ninth coupler, and the pump light that enters the second input end of the seventh coupler is coupled by the seventh coupler and is sent to an input end of the second erbium doped fiber through the output end of the seventh coupler.

13. The optical repeater according to claim 12, wherein the input end of the second pump light processing component comprises a first input end of the second pump light processing component and a second input end of the second pump light processing component; and
the first input end of the second pump light processing component is a port that is of the second pump light processing component and that is connected to the second input end of the eighth coupler; and the second input end of the second pump light processing component receives a reverse pump light that comes from an optical path of a signal light on a side opposite to the signal light.

14. The optical repeater according to claim 13, wherein the second pump light processing component comprises:
  a fourth pump source, a second polarization beam combiner, a fifteenth coupler, a sixteenth coupler, and a seventeenth coupler,
  wherein:
    an output end of the fourth pump source is connected to an input end of the second polarization beam combiner, an output end of the second polarization beam combiner is connected to an input end of the fifteenth coupler, a first output end of the fifteenth coupler is connected to a first input end of the sixteenth coupler, a first output end of the sixteenth coupler is used as the first output end of the second pump light processing component, and a second output end of the sixteenth coupler is used as the second output end of the second pump light processing component;
    a first input end of the seventeenth coupler is used as the first input end of the second pump light processing component, a second input end of the seventeenth coupler is used as the second input end of the second pump light processing component, and a first output end of the seventeenth coupler is connected to a second input end of the sixteenth coupler;
    the fourth pump source generates local-end pump lights and sends the local-end pump lights to the input end of the second polarization beam combiner through the output end of the second pump source, and then to the input end of the fifteenth coupler through the output end of the second polarization beam combiner, and the fifteenth coupler couples the local-end pump lights that enter the fifteenth coupler and sends a part of a local-end pump light obtained through coupling to the first input end of the sixteenth coupler;
    the seventeenth coupler couples the reverse pump light that comes from the eighth coupler and enters the first input end of the seventeenth coupler and the reverse pump light that comes from the optical path of a signal light on a side opposite to the signal light and enters the second input end of the seventeenth coupler, and sends a part of a reverse pump light obtained through coupling to the second input end of the sixteenth coupler through a first output end of the seventeenth coupler; and
    the sixteenth coupler couples the reverse pump light that enters the second input end of the sixteenth coupler and the local-end pump light that enters the first input end of the sixteenth coupler, sends a part of a pump light obtained through coupling to the ninth coupler through the first output end of the sixteenth coupler, and sends another part of the pump light obtained through coupling to the seventh coupler through the second output end of the sixteenth coupler.

15. The optical repeater according to claim 12,
wherein the eighth coupler is a third circulator, wherein the third circulator is a circulator in which a first port, a second port, and a third port are connected in sequence; and
wherein the first port of the third circulator is the first input end of the eighth coupler, the second port of the third circulator is the output end of the second coupler, and the third port of the third circulator is the second input end of the second coupler.

16. The optical repeater according to claim 12,
wherein the ninth coupler is a fourth circulator; the fourth circulator is a circulator in which a first port, a second port, and a third port are connected in sequence; and
wherein the first port of the fourth circulator is the second output end of the ninth coupler, the second port of the fourth circulator is the input end of the ninth coupler, and the third port of the fourth circulator is the first output end of the ninth coupler.

17. The optical repeater according to a claim 12, wherein a gain flatness filter is further concatenated in an optical path of the signal light.

* * * * *